United States Patent [19]

Nejati

[11] Patent Number: 5,664,457
[45] Date of Patent: Sep. 9, 1997

[54] SCREW GEAR MEANS AND METHOD FOR SAME

[75] Inventor: Amir G. Nejati, Lincolnwood, Ill.

[73] Assignee: Amir Nejati, Lincolnwood, Ill.

[21] Appl. No.: 265,690

[22] Filed: Jun. 24, 1994

Related U.S. Application Data

[63] Continuation of Ser. No. 895,987, Jun. 5, 1992, abandoned.

[51] Int. Cl.$^6$ .................... F16H 19/04; F16H 1/16
[52] U.S. Cl. .................... 74/110; 74/89.14; 74/89.17; 74/109; 74/422; 74/425
[58] Field of Search ................. 74/10.85, 89.14, 74/89.17, 109, 110, 422, 425

[56] References Cited

U.S. PATENT DOCUMENTS

| | | | |
|---|---|---|---|
| 617,684 | 1/1899 | Friez | 74/416 |
| 1,660,368 | 2/1928 | Asbury | 74/10.85 X |
| 1,681,994 | 8/1928 | Miller | 409/48 X |
| 1,888,782 | 11/1932 | Zimmermann | 409/48 X |
| 2,106,088 | 1/1938 | De Tar | 74/425 |
| 2,842,976 | 8/1958 | Young | 74/425 |
| 2,894,409 | 7/1959 | Fuchs | 74/437 X |
| 3,012,448 | 12/1961 | Abraham | 74/425 X |
| 3,141,348 | 7/1964 | Dixon | 74/425 |
| 3,277,678 | 10/1966 | Booth | 74/425 X |
| 3,449,971 | 6/1969 | Posh | 74/425 |
| 3,768,326 | 10/1973 | Georgiev et al. | 74/425 |
| 3,772,936 | 11/1973 | Conrad | 74/434 |
| 3,895,700 | 7/1975 | Kerr | 74/425 X |
| 4,142,739 | 3/1979 | Billingsley | 285/912 X |
| 4,425,815 | 1/1984 | Norton et al. | 74/425 |
| 4,428,104 | 1/1984 | Smith | 24/20 LS X |
| 4,521,141 | 6/1985 | Abe | 409/48 |
| 4,588,336 | 5/1986 | Navarro | 409/48 X |
| 4,589,299 | 5/1986 | Kobayashi et al. | 74/425 X |
| 5,171,927 | 12/1992 | Kubicki et al. | 84/304 |

FOREIGN PATENT DOCUMENTS

| | | | |
|---|---|---|---|
| 1233322 | 10/1960 | France | 74/425 |
| 1289894 | 2/1969 | Germany | 74/10.85 |

OTHER PUBLICATIONS

"Design of Worm and Spiral Gears"; Manual; Aug. 1964; Buckingham & Ryffel; (3 pages—note p. 29).

McGraw-Hill, Dictionary of Scientific and Technical Terms, 4th ed., McGraw Hill, 1989, p. 870.

*Primary Examiner*—Allan D. Herrmann
*Attorney, Agent, or Firm*—Shapor Nejati

[57] ABSTRACT

A machine element in the form of a screw gear having a threaded circumferential portion adapted to be engaged by a standard thread screw used as a worm is disclosed. Relative rotation of the standard thread screw with respect to the threaded portion of the screw gear causes the screw gear to also relatively rotate. Additionally, linear motions of the screw are possible wherein the screw gear acts as a pinion while the standard thread screw acts as a rack. This screw gear and its associated standard thread screw can be operated as either a worm and gear or as a rack and pinion. The screw gear and/or standard thread screw engaged therewith may be manually or power operated. The screw gear can be made by cutting or forming a threaded circumferential portion on the screw gear blank with a standard screw tap of the same size as the standard thread screw with which the screw gear is to be used. Additionally the screw gear can be formed in other conventional manner such as by molding. The screw gear and its associated standard thread screw may be made part of various screw gear-standard thread screw devices and may be used in various mechanisms for adjustment or other purposes.

8 Claims, 37 Drawing Sheets

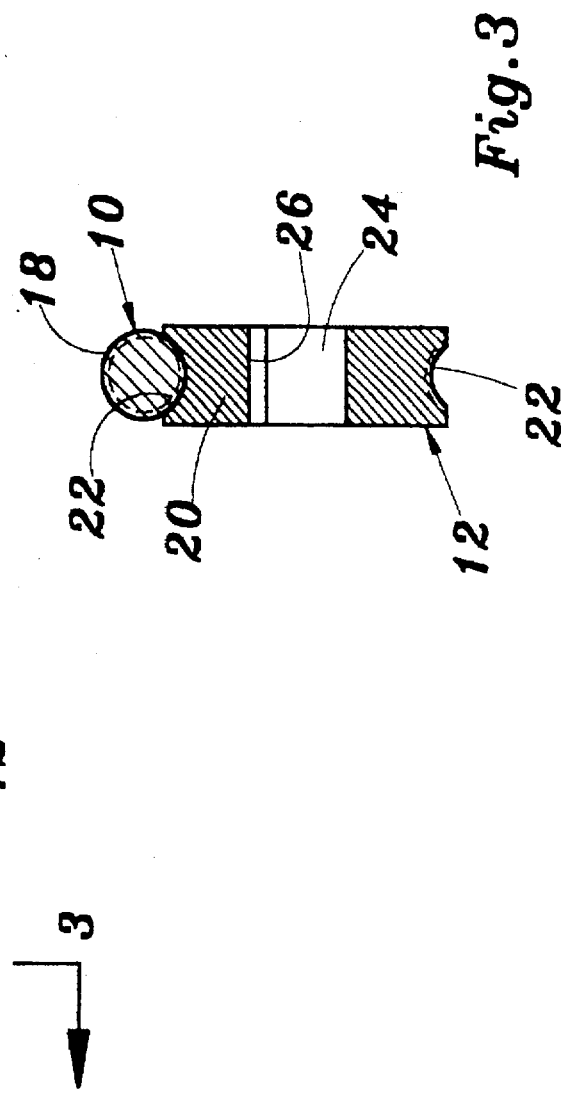
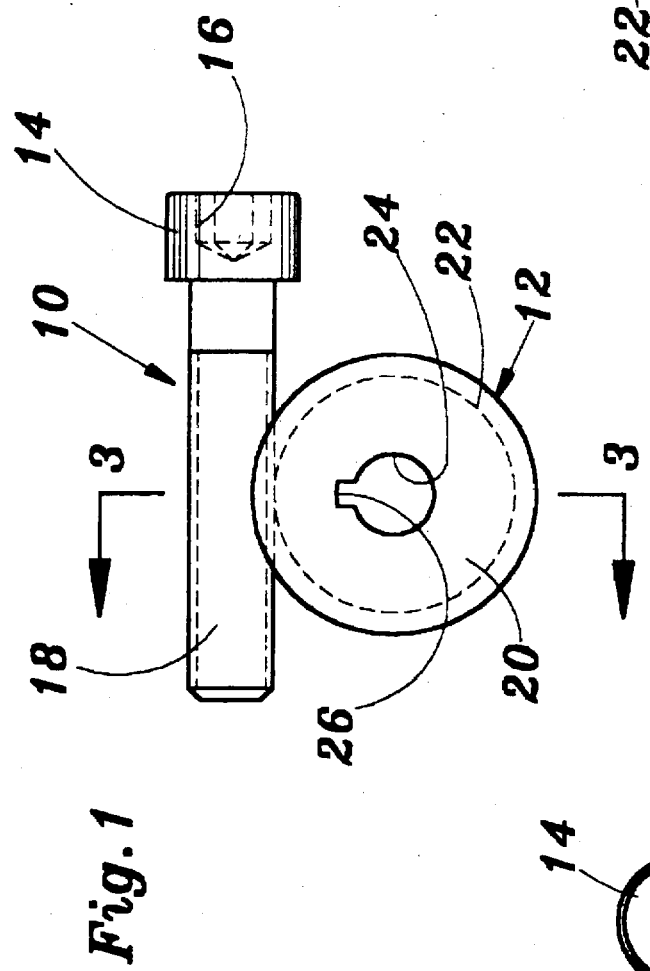
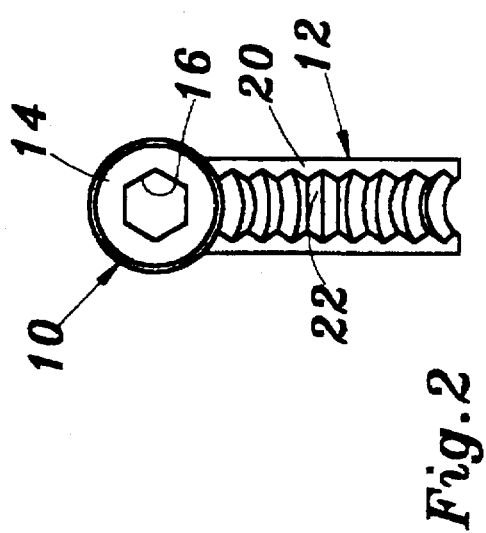

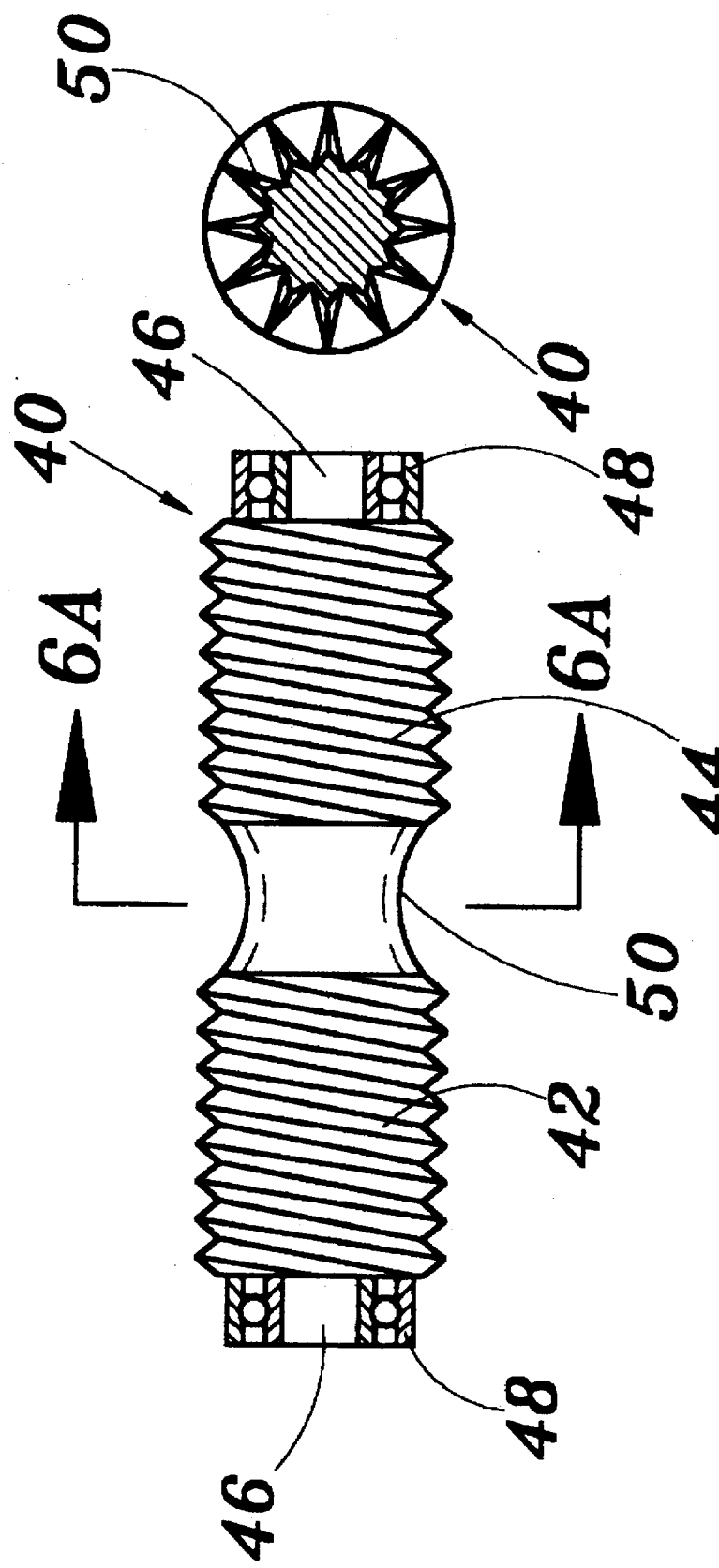

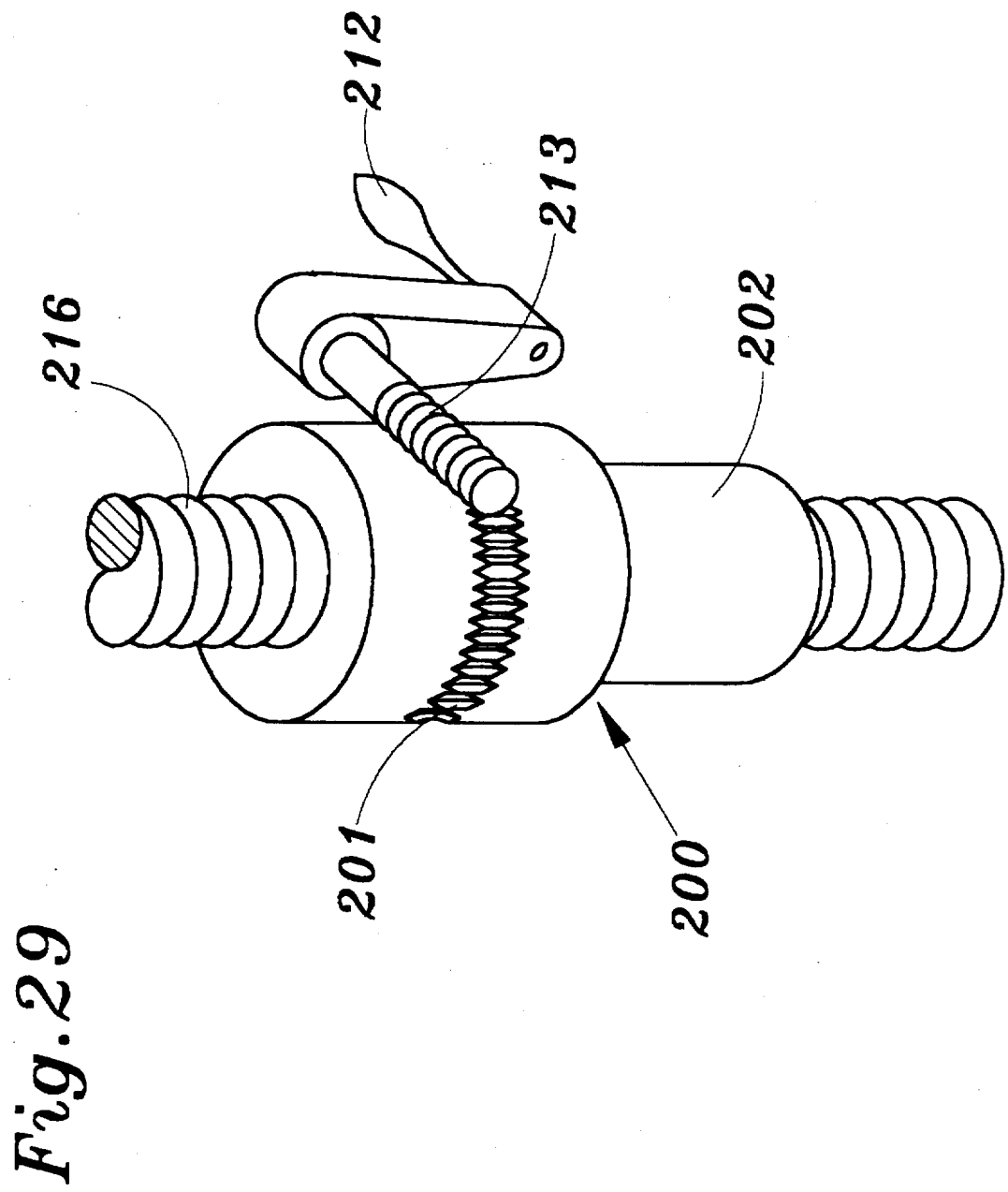

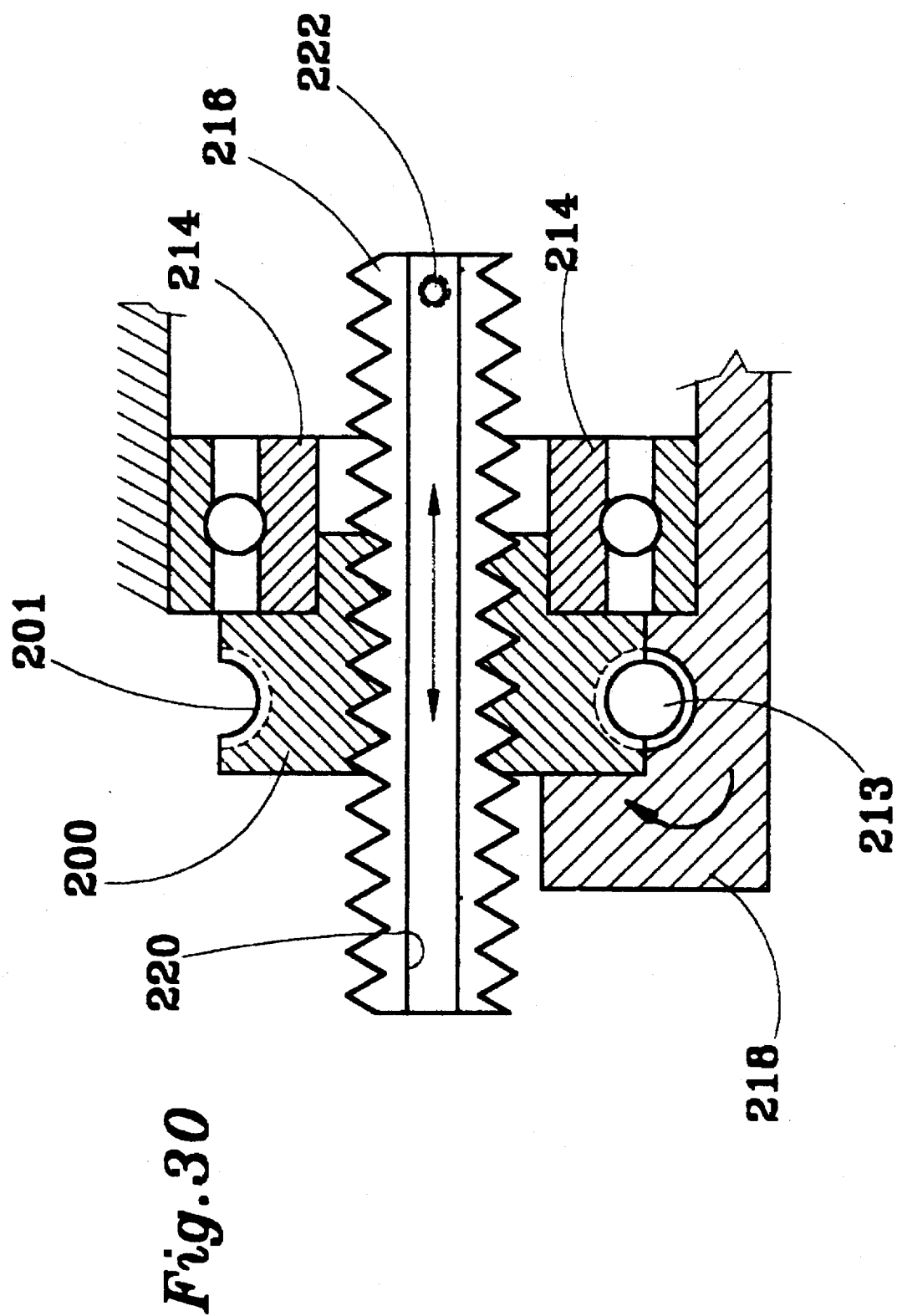

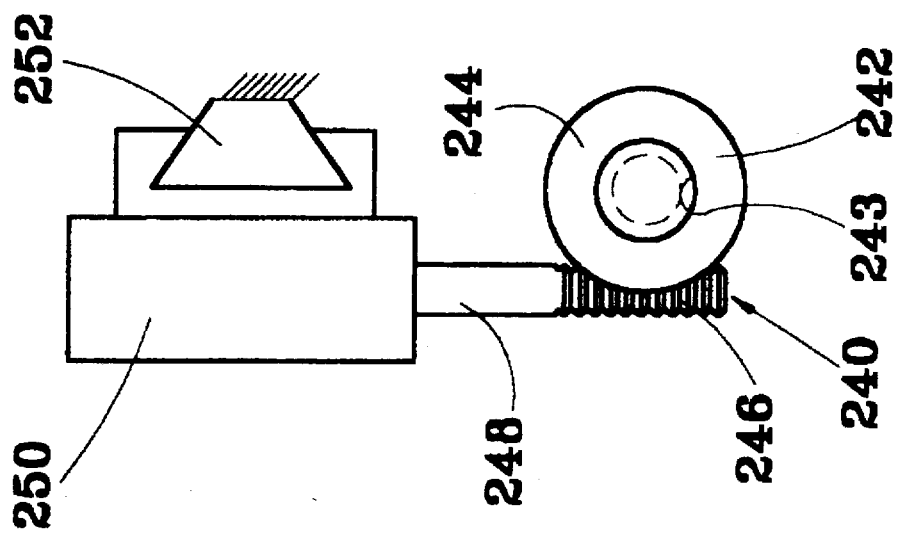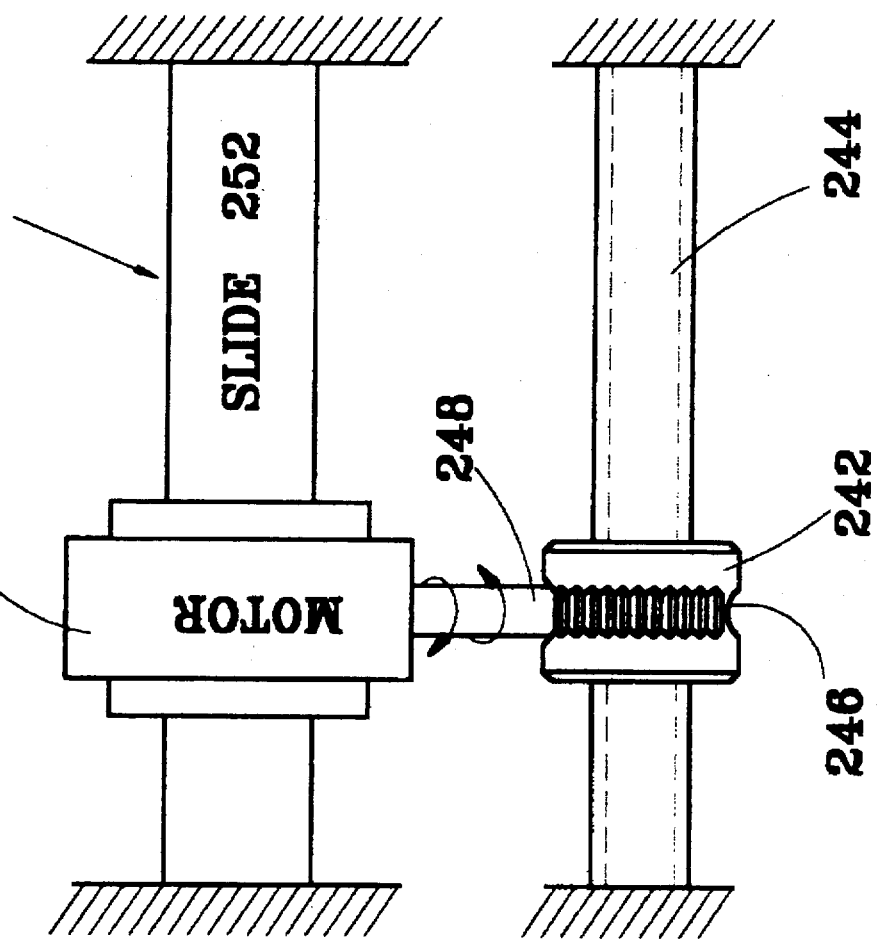

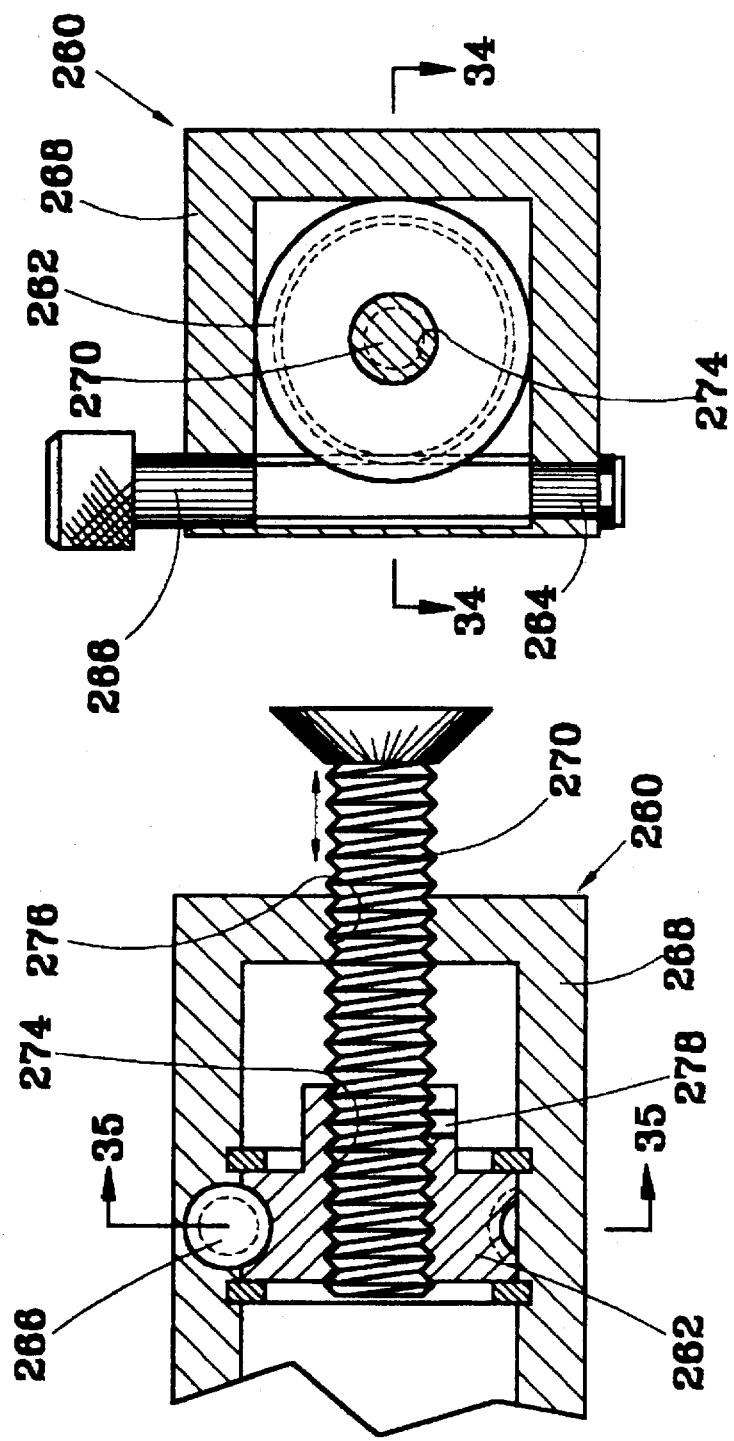

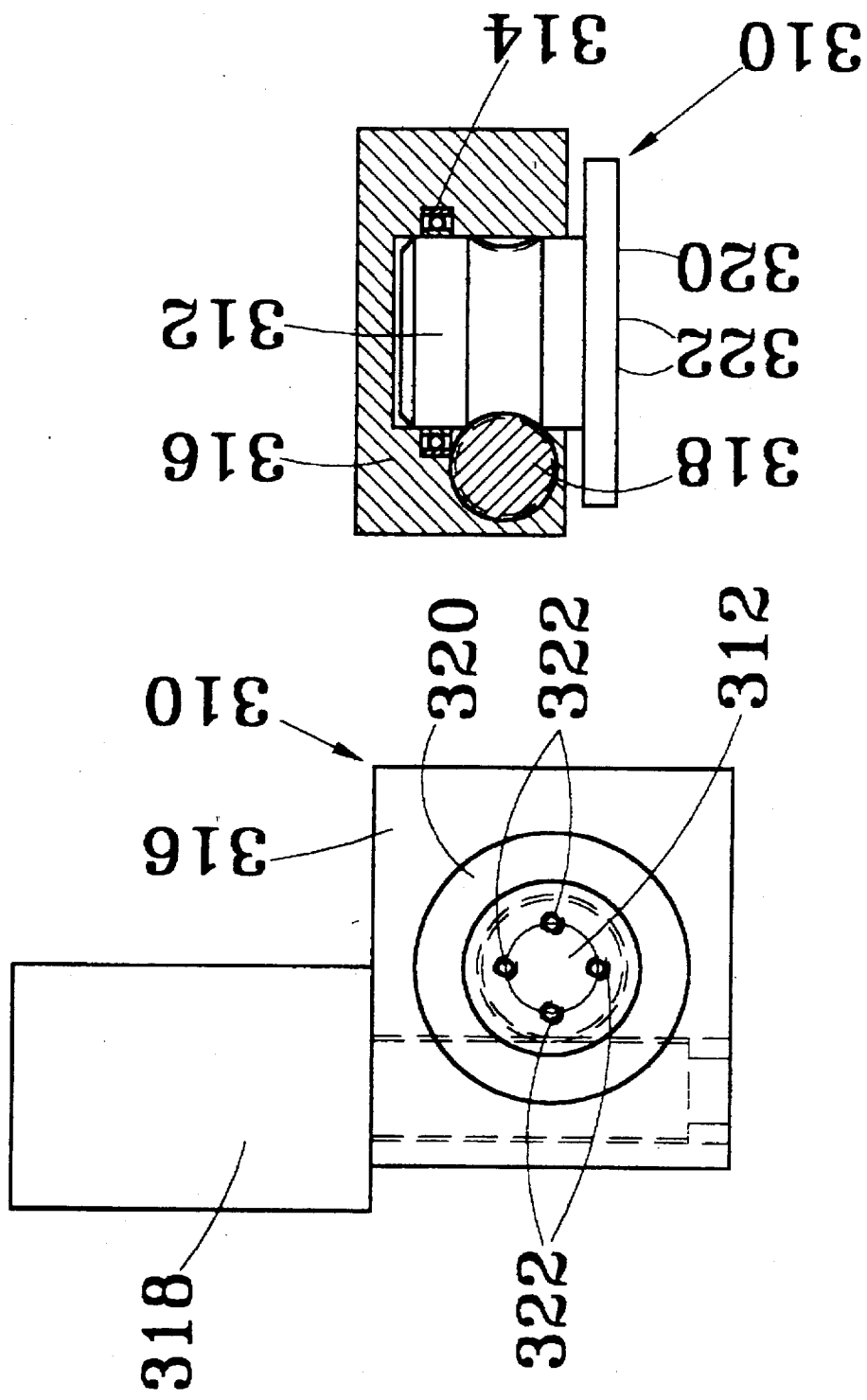

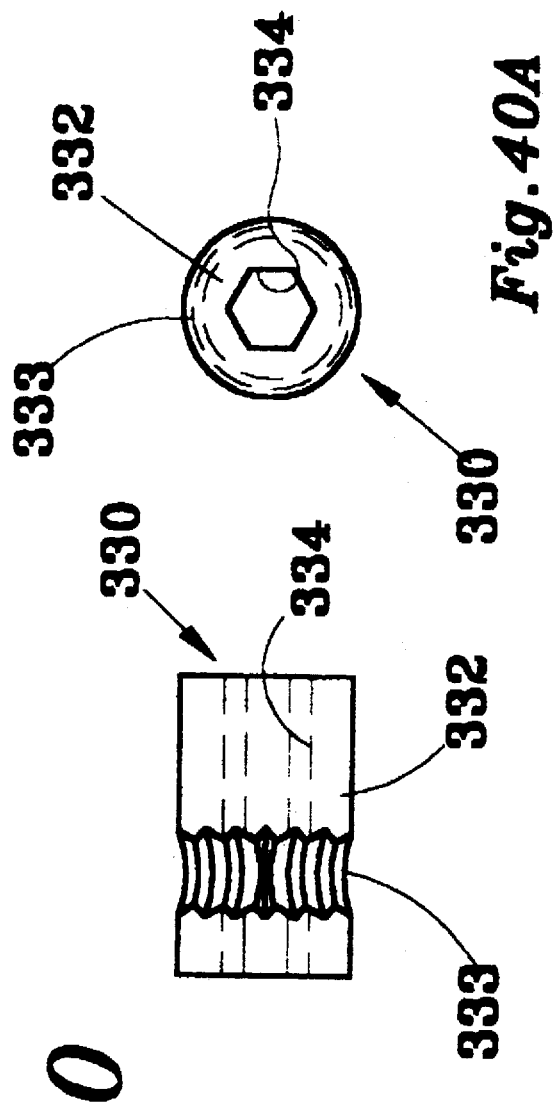

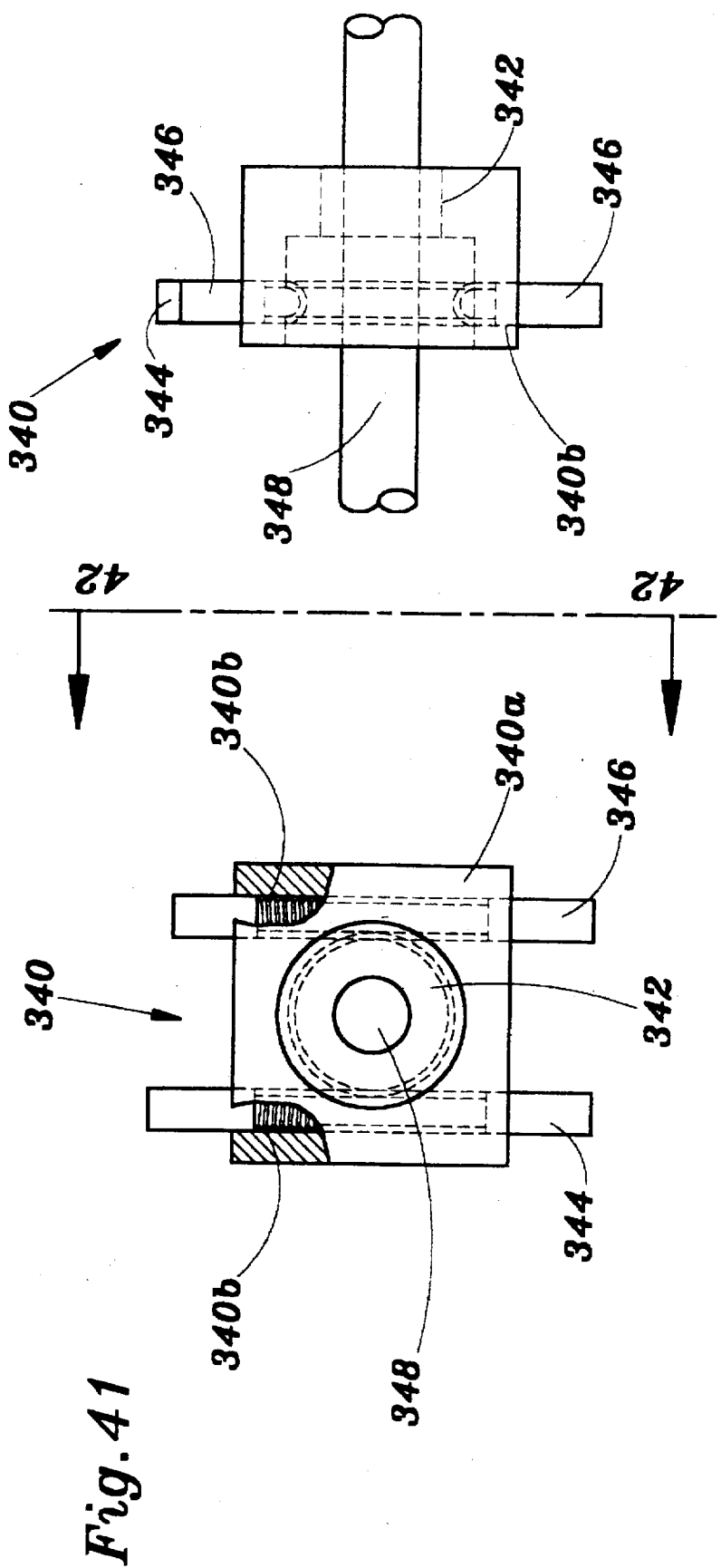

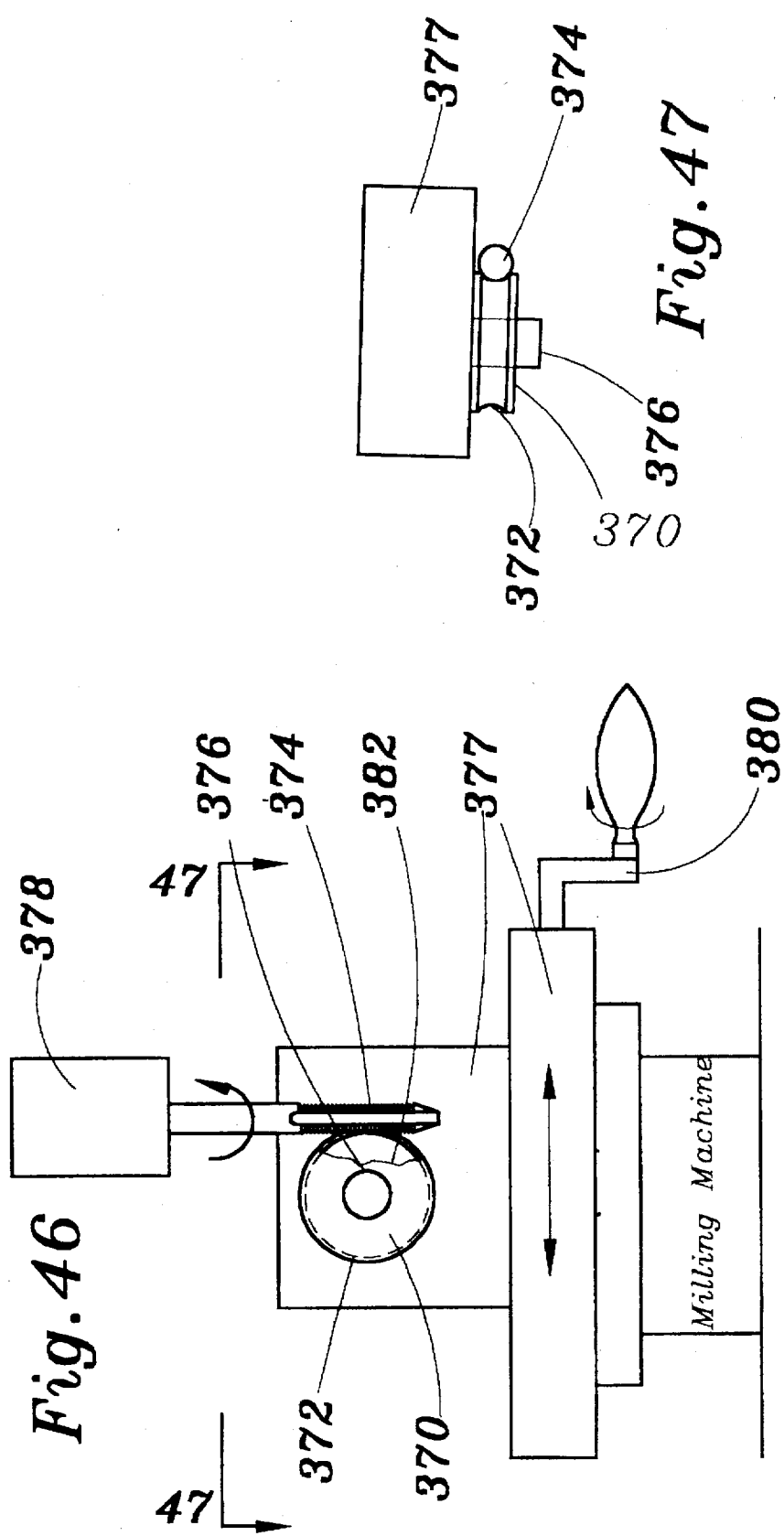

SCREW GEAR MEANS AND METHOD FOR SAME

This is a continuation of application Ser. No. 07,895,987 filed on Jun. 5, 1992, now abandoned.

DISCLOSURE

This invention relates to worm and gear and/or rack and pinion mechanisms, and, more particularly, to a worm and gear and/or rack and pinion utilizing a standard screw thread as the worm and or rack.

BACKGROUND OF THE INVENTION

Worm and gear and rack and pinion mechanisms are well known and are utilized to make various mechanisms, particularly for power transmission and adjustment purposes. For example, see U.S. Pat. Nos. 219,892; 305,234; 373,192; 606,700; 611,277; 1,406,985; 1,714,109; 1,879,196; 2,102,540; 2,344,508; 2,410,544 and British patent 484,928, which not only shows the operations of prior art worms and gears, but in many instances also shows how to form worms and gears. However, a particular disadvantage of prior worm and gears and/or rack and pinion was that they required a special cut or formed surface on both the worm or rack and gear or pinion. The use of these special worm and gear or rack and pinion cut or formed surfaces increased costs, reduced the availability and utilization of the worm and gear or rack and pinion in many mechanisms. The necessity for these prior art special shapes required complicated and/or special tooling to form such surfaces, which contributed to the expense and reduced utilization.

The prior art worm-gear and/or rack and pinion constructions were disadvantageous in that they: (1) required a special tool to cut the worm and gear or rack and pinion; (2) required a special tool to divide the circumference of the blank per number of teeth desired; (3) was not self-feeding; (4) required to feed one tooth at a time; (5) required extensive movement of the cutting tool for the next tooth; (6) was not readily available; (7) was expensive to make and consequently to use; (8) was not standardized; (a) was not available in any hardware store; (10) was not readily available in any length or long lengths; (11) was not easy to replace; and did not help standardize the mechanisms, and (12) does not lend itself to compact mechanical design.

SUMMARY OF THE PRESENT INVENTION

The present invention is a novel gear in the form of screw gear suitable for use with a standard thread screw, such as a conventional screw which is available over the counter in a hardware or industrial supply store, to form a worm and gear and/or a rack and pinion mechanism. Unlike either prior art worm and gears or prior art rack and pinions, the screw gear and standard thread screw can be used as both a worm and gear and rack and pinion. The screw gear has a standard screw thread formed on its periphery or circumference which is compatible with the standard thread screw. Preferably these standard threads could be any one of a family of standard screw, such as by way of example, American National Unified Threads (UN, UNC, NC, UNF, NF, UNEF, NEF, UNREF), Unified Screw Threads, American Standard Threads, American National Standard Metric Screw Threads, (General Purpose, Mechanical Fastener, Fine Pitch), British Withworth Screw Threads, British Standard Fine Screw Threads, British Association Screw Threads, Straight Pipe Threads, British Standard Metric Threads, Lowenherz Threads, and SAE Threads, in any available size, such as in the inch or metric dimension, in any diameter and of any desired length. Of course, to permit rotation of the screw gear beyond 360°, the number of threads on the screw gear must be a whole number. This latter requirement determines a certain minimum practical diameter for each size and thread screw. Likewise the depth the screw engages the screw gear must be controlled to prevent excessive undercutting of the threads on the screw gear.

In the method of the present invention the screw gear can be formed by using substantially a common tap for the standard screw thread and using it to cut or form the associated threaded portion on the circumference of the screw gear blank. Both the tap and screw gear blank are mounted on a jig for rotation with the length of the tap extending generally in the plane of the screw gear (generally tangential to the screw gear blank). As the tap is turned, it cuts the threaded portion on the circumference on the screw gear and also causes the screw gear to feed itself into the tap. As stated above, where full rotation of the screw gear is desired the radius or diameter of the screw gear on the thread circumferential portion thereof is selected to provide for a full number of threads thereon. Of course, a screw gear for less than 360° rotation could also be made. To avoid undercutting the screw gear, the tap is best modified by cutting away the trailing edge of the tap. Of course, the screw gear could be formed by other thread or gear forming processes such as hobbing, thread rolling, casting or molding.

The standard thread screw gear and standard thread screw of the present invention can be utilized in various type mechanisms wherein a worm and gear or rack and pinion might have been utilized to transmit power and motions and make adjustments. To this end the screw gear can be rotatably mounted, have a hub, which may be internally or externally threads or both, have portions with separate threads, have different hands, right and left hand, threads, have non circular openings, such as square, hexagonal, etc., have means for preventing rotation, such as key or keyways roll pins or set screws, have conventional gear portions, engage several standard thread screws, or be mounted to another screw gear with the same or different thread. These screw gears can have a circumferential threaded portion formed in or a cylindrical, spherical, conical, hexagonal or other non-round shaped body forming the screw gear blank. The screw gear can be utilized in a manual or motorized mechanism to cause various type movements, such as, by way of example, adjusting, clamping, raising, lowering, moving one way or another, for any or various purposes, such as speed reduction (the torque capacity being dependent upon screw thread size), mechanical advantage increases or decreases, rotating, sliding, jacking, clamping, indexing, tightening, forcing together or apart members, etc.

The screw gear (or pinion) -standard thread screw (worm or rack) of the present invention (1) requires no special tooling to cut the thread teeth, the worm or rack being readily available and the screw gear can be cut with a conventional thread tap of appropriate thread size compatible with the screw thread chosen; (2) no special dividing tool to get a whole number of teeth (threads) is needed, such being achieved by appropriate selection of the blank circumference; (3) the cutting operation can be conducted with a readily available tap and is self-feeding; (4) the screw gear can be formed with a readily purchased screw thread tap; (5) should the standard thread screw (worm or rack) need replacement due to breakage or wear, such can be readily obtained from almost any hardware stores; (6) mechanism standardization is greatly assisted; (7) there is cost effectiveness; (8) easy replacement; (9) easy to location of replacement screws (worm) or rack, and availability in a wide variety of standard size threads in convenient and very long lengths and (10) the myriad of size of standard thread screws facilitates compact mechanical design.

The screw gear could be formed of many materials such as materials of or compatible with the associated standard thread screw which form the worm or rack, such as rubber, plastic, brass, stainless steel, bronze, steel, aluminum, phenolic resin, wood, ceramic or glass, but to name a few. An object of the present invention is to provide a novel worm and gear and/or rack and pinion machine element construction utilizing a screw gear compatible with a standard thread screw.

Yet another object of the present invention is to provide a screw gear utilizing and having a circumferential threaded portion with a thread from one of the family of standard screws, such as, but not limited to, the screw families known as, by way of example, American Unified Threads (UN, UNC, NC, UNF, NF, UNEF, NEF, UNREF, NEF), Unified Screw Threads, American Standard Threads, American National Standard Metric Screw Threads, (General Purpose, Mechanical Fastener, Fine Pitch) Acme Threads, Butress Inch Screw Threads, British Withworth Screw Threads, British Standard Fine Screw Threads, British Association Screw Threads, Straight Pipe Threads, British Standard Metric Threads, Lowenberg Threads, Trapezoid Metric Threads and SAE Threads.

Still another object of the present invention is to provide an economical worm and gear and/or rack and pinion construction utilizing standard screw threads which are commonly available.

A further object of the present invention is to provide a method of making the screw gear of the present invention.

An additional objective of the present invention is to incorporate the screw gear and standard thread screw in various mechanisms of the present invention.

These and other objects of the present invention will be apparent from the following written descriptions and the accompanying figures of the drawings wherein:

BRIEF DESCRIPTION OF THE DRAWINGS

FIG. 1 is a front view of a first embodiment of a standard thread screw and screw gear of the present invention shown in a schematic arrangement.

FIG. 2 is a side view of the embodiment shown in FIG. 1.

FIG. 3 is a cross-sectional view taken along the line 3—3 of FIG. 1.

FIG. 6 is an elevation of a third embodiment screw gear with external threaded portions on either side and outer stubs mounted in bearings, such as ball bearings.

FIG. 6A is a cross-section view taken on the line 6A—6A of FIG. 6.

FIG. 9A shows a side elevational view of the screw gear shown in FIG. 9.

FIG. 11A shows a side elevation of the screw gear of FIG. 11.

FIG. 29 is a perspective view of the screw gear and crank carrying a standard screw threaded similar to that shown in FIG. 28.

FIG. 30 is a cross-sectional view of another mechanism, similar to that shown in FIG. 28, but showing a keyway formed in the central threaded rod engaging a pin to keep the housing from rotating.

FIG. 32 is a motorized sliding mechanism having a fifteenth embodiment screw gear rotatably mounted and threaded on a fixed threaded rod, with the standard thread worm formed in the motor shaft, which motor is mounted to slide along on an elongated slide parallel to the threaded screw in a manner that rotation of the screw moves the screw gear as it rotates along the threaded rod, which then causes the motor shaft and motor itself to slide along the slide.

FIG. 32A is a side elevation of the mechanism shown in FIG. 32.

FIG. 34 is a cross-sectional view taken along the line 35—35 of an adjustment mechanism having a screw gear similar to that shown in FIGS. 4 and 5, which can be rotated by a piloted allen head bolt standard thread screw worm in a manner to cause the screw gear which is rotatably mounted in a hollow housing, such as a chair leg, to move a thread rod, held to the screw gear, as by an allen screw, extending through threaded openings in both the screw gear and housing to move up and down to, say, level the chair.

FIG. 35 is a cross-sectional view taken along the line 35—35 of FIG. 34.

FIG. 39 is a mechanism, such for example indexing, having a seventeenth embodiment screw gear rotatably mounted by a bearing in a housing, operable by its standard thread screw worm, and carrying an outer portion with a plurality of mounting holes.

FIG. 39A is a cross sectional view of the mechanism of FIG. 39.

FIG. 40 is an elevational view of an eighteenth embodiment of cylindrical body screw gear having an internal, in this instance, hexagonal opening.

FIG. 40A is a side plan view of the embodiment shown in FIG. 40.

FIG. 41 is an plan view of a mechanism which can function as a rotary actuator (rack and pinion or worm and gear) and/or a locking mechanism having a housing carrying a screw gear (pinion) which in turn engages with two standard thread screws (which can also function as racks or worms) rotation of one or the other screw causing rotation of the screw gear and linear motion of the other screw, or linear motion of one screw causing linear motion of the other screw, with the screw gear having a shaft affixed thereto of which various portions of this mechanism could, if desired, be power operated.

FIG. 42 is a side elevational view of the rack and pinion and/or worm and gear screw gear standard thread screw mechanism of FIG. 41.

FIG. 46 is a schematic view showing how the screw gear of the present invention may have its threaded portion thereon formed by a tap mounted in a milling machine.

FIG. 47 is a cross-section taken along the line 47—47 of FIG. 46.

DESCRIPTION OF THE PREFERRED EMBODIMENT

Figure 5:
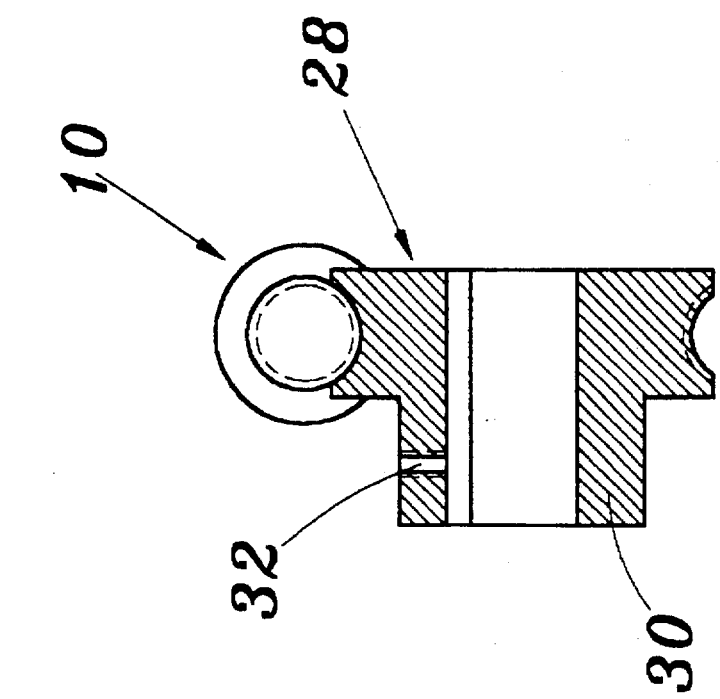
FIG. 5 is a cross-sectional view taken along the line 5—5 of FIG. 4.

Referring to FIGS. 1 to 3, a first embodiment of a standard thread screw means 10 and screw gear means 12 of the present invention is shown in a schematic arrangement. The screw 10 is conventional and has a head 14, in this instance of the Allen slot type 16, but could be of the slotted, phillip, hexagonal or any other conventional type with a conventional threaded portion 18. As is shown the screw gear 12 has a cylindrical body 20 with a compatible threaded portion 22. The screw gear 12 has for mounting purposes a central opening 24 on its axis in which, in this instance, a keyway 26 is formed. The screw threads 18 on the screw 10 determine the screw thread for the screw gear 12 and can be of any standard size or type as discussed above.

Figure 4:
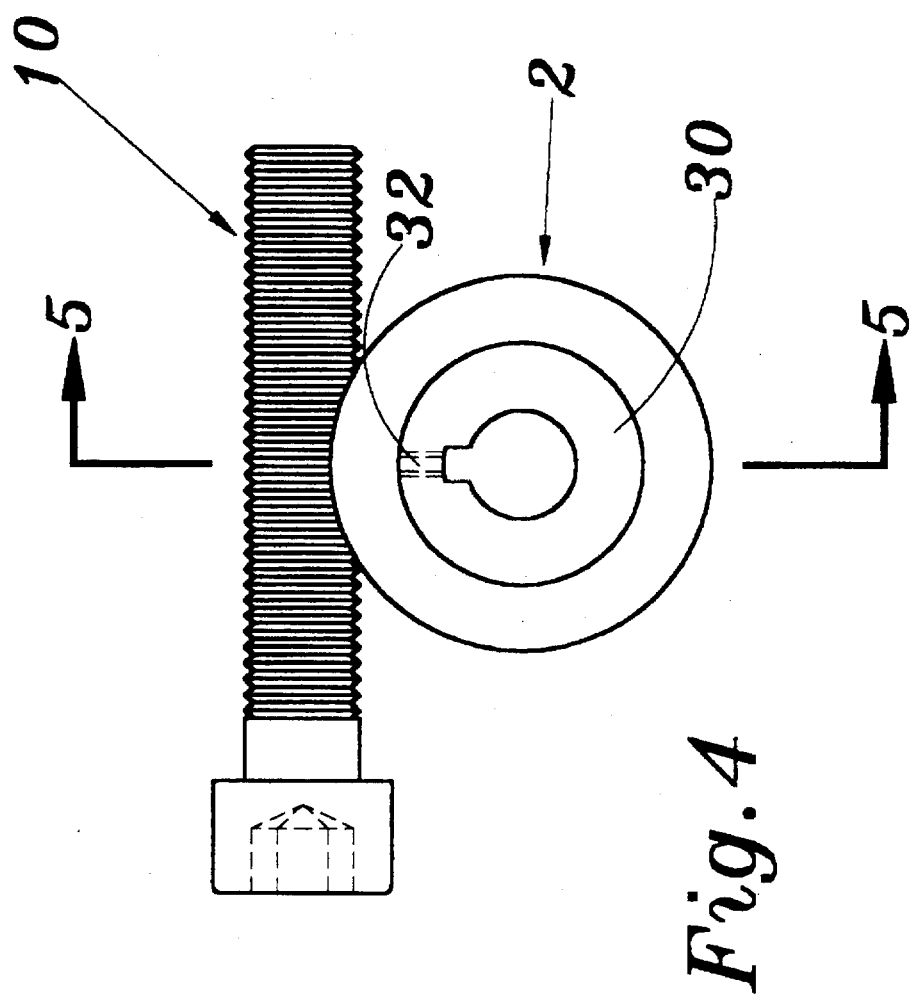
FIG. 4 is a view similar to FIG. 1 but of a second embodiment screw gear.

Referring to FIGS. 4 and 5 a second embodiment 28 of the invention has a similar screw and screw gear as in FIGS. 1 and 3, but with a hub 30 extending to one side of the screw gear fitted with a set screw 32. To the extent similar, the same reference numerals are used as were used with FIGS. 1 to 3.

Referring to FIGS. 6 and 6A, a third embodiment 40 of screw gear with external threaded portions 42 and 44 on either side and outer stubs 46 mounted in bearings 48, such as ball bearings, is shown. In this instance the threaded portions 42 and 44 are of the same hand, but could have been of opposite hands. The screw gear has a central threaded portion 50.

Figure 7:
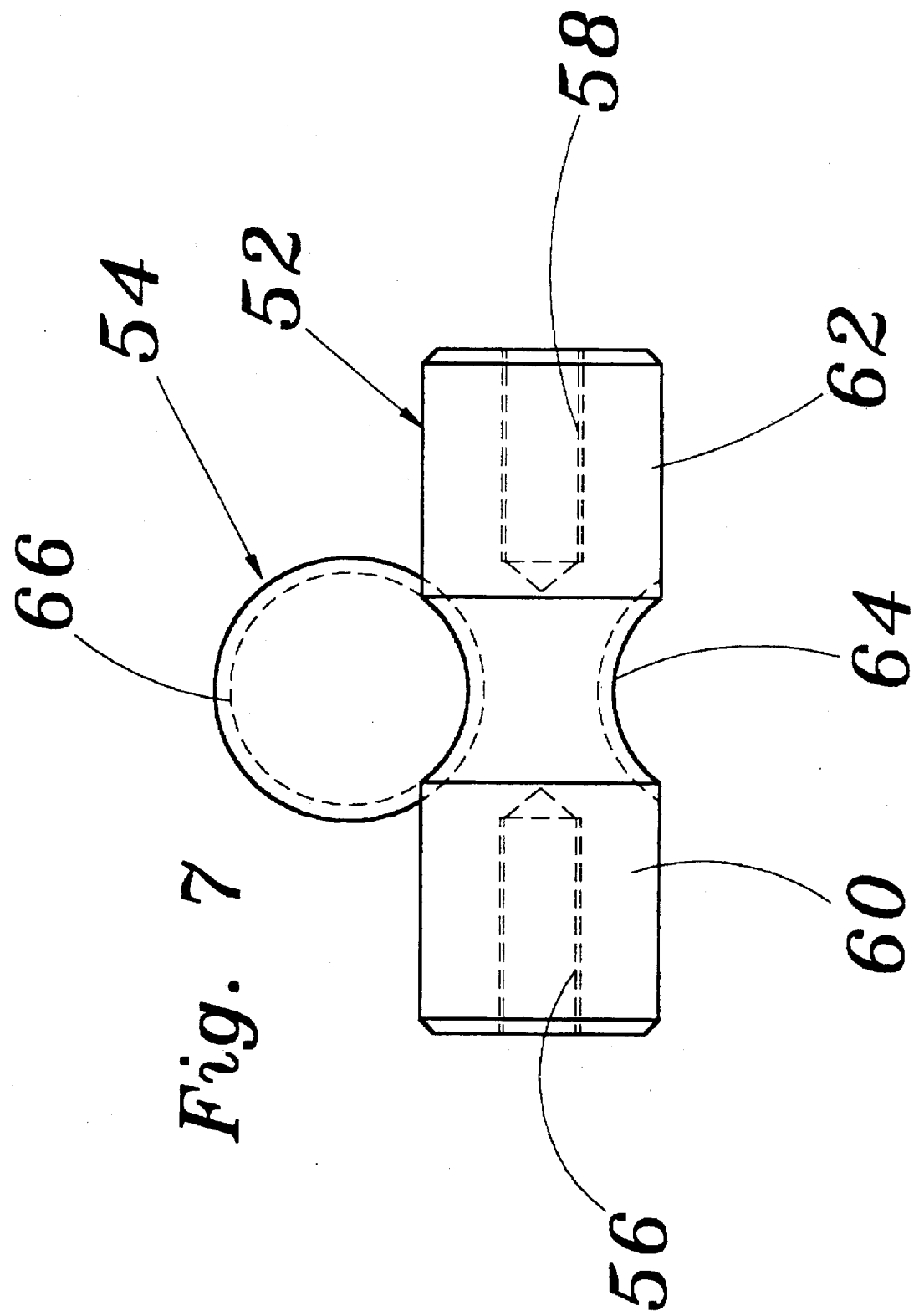
FIG. 7 is an elevational view of a fourth embodiment screw gear with internal threaded portions on either side.

Referring to FIG. 7, a fourth embodiment screw gear 52 engaged with a standard threaded screw 54, with internal threaded portion 56 and 58 on either sides 60 and 62 is shown. Again the threaded portion 64 of the screw gear is compatible with and engages the thread 66 of the screw 54.

Figure 8:
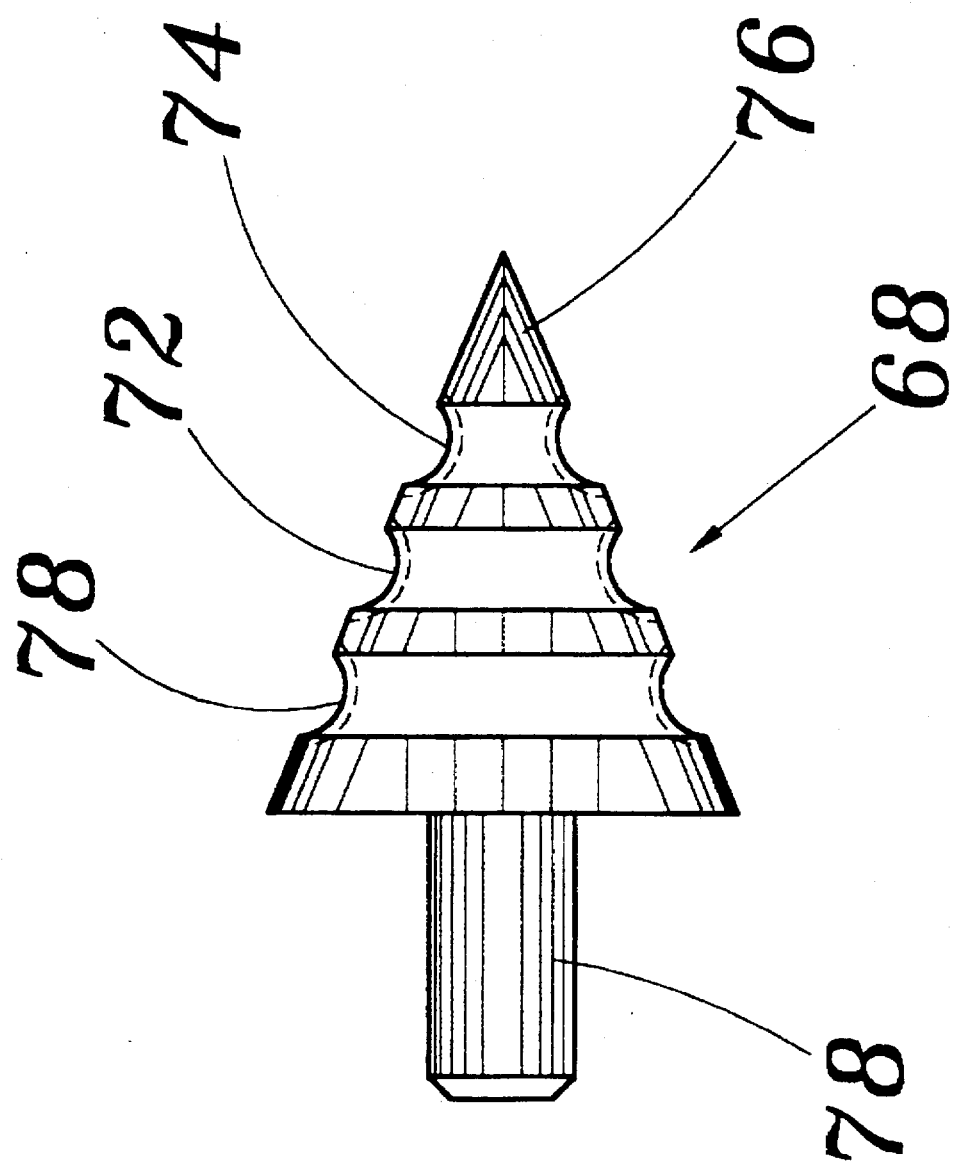
FIG. 8 is an elevational view of a fifth embodiment screw gear with a plurality of screw gear portions on a conical shaped body having a stub axial at one end.

Referring to FIG. 8, a fifth embodiment screw gear 68 with a plurality of threaded screw gear portions 70, 72 and 74 on a conical shaped body 76 having a rod or stub-axial at one end is shown.

Figure 9:
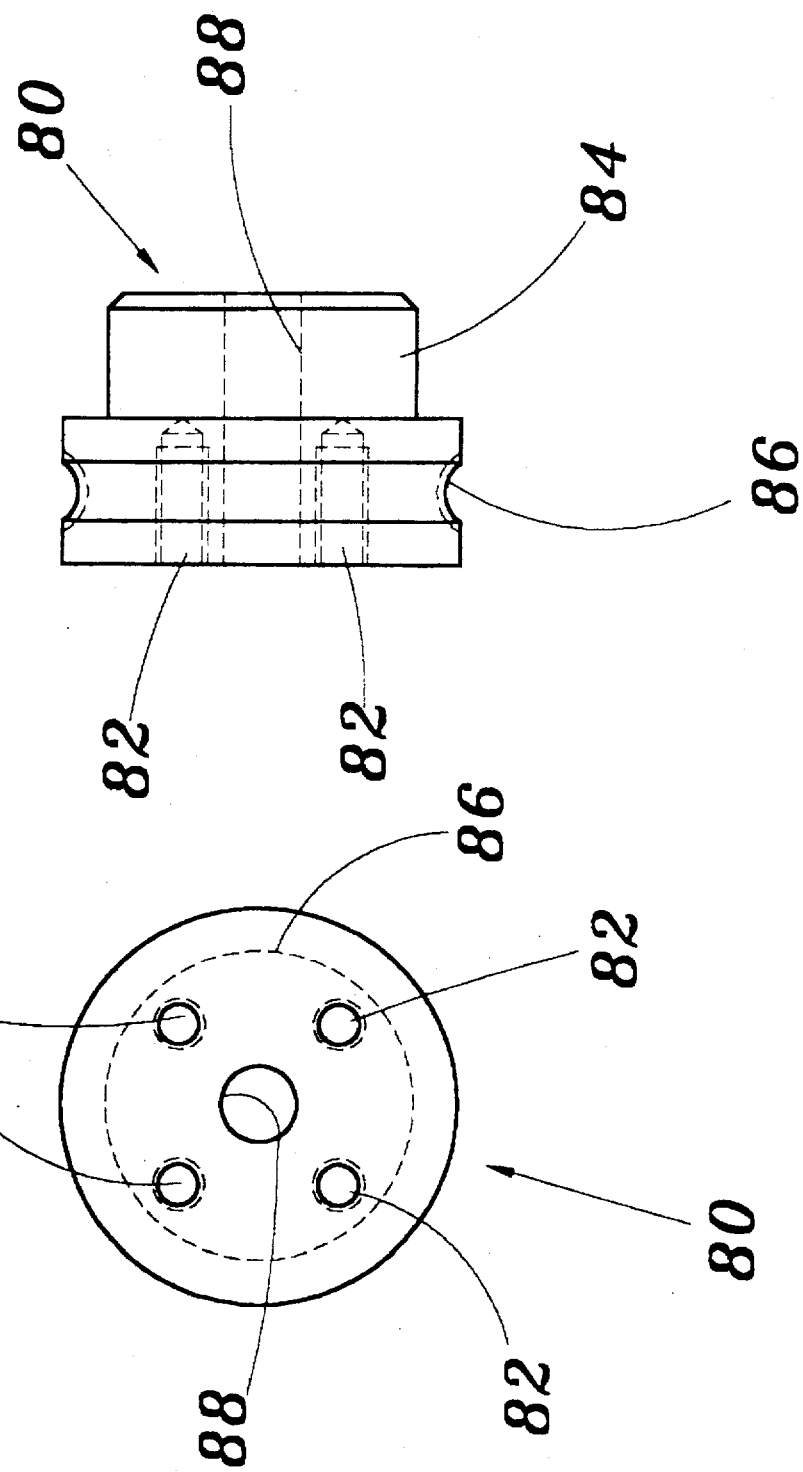
FIG. 9 is a part elevational view of a sixth embodiment screw gear having a plurality of threaded openings.

Referring to FIG. 9, a sixth embodiment screw gear 80 having a plurality of threaded openings, 82 on a hub 84 is shown. The screw gear threaded portion 86 would be, of course, compatible with the standard thread screw with which it is to be used. The center can be provided with a central opening 88 if desired which could be plain, keyed or threaded.

Figure 10:
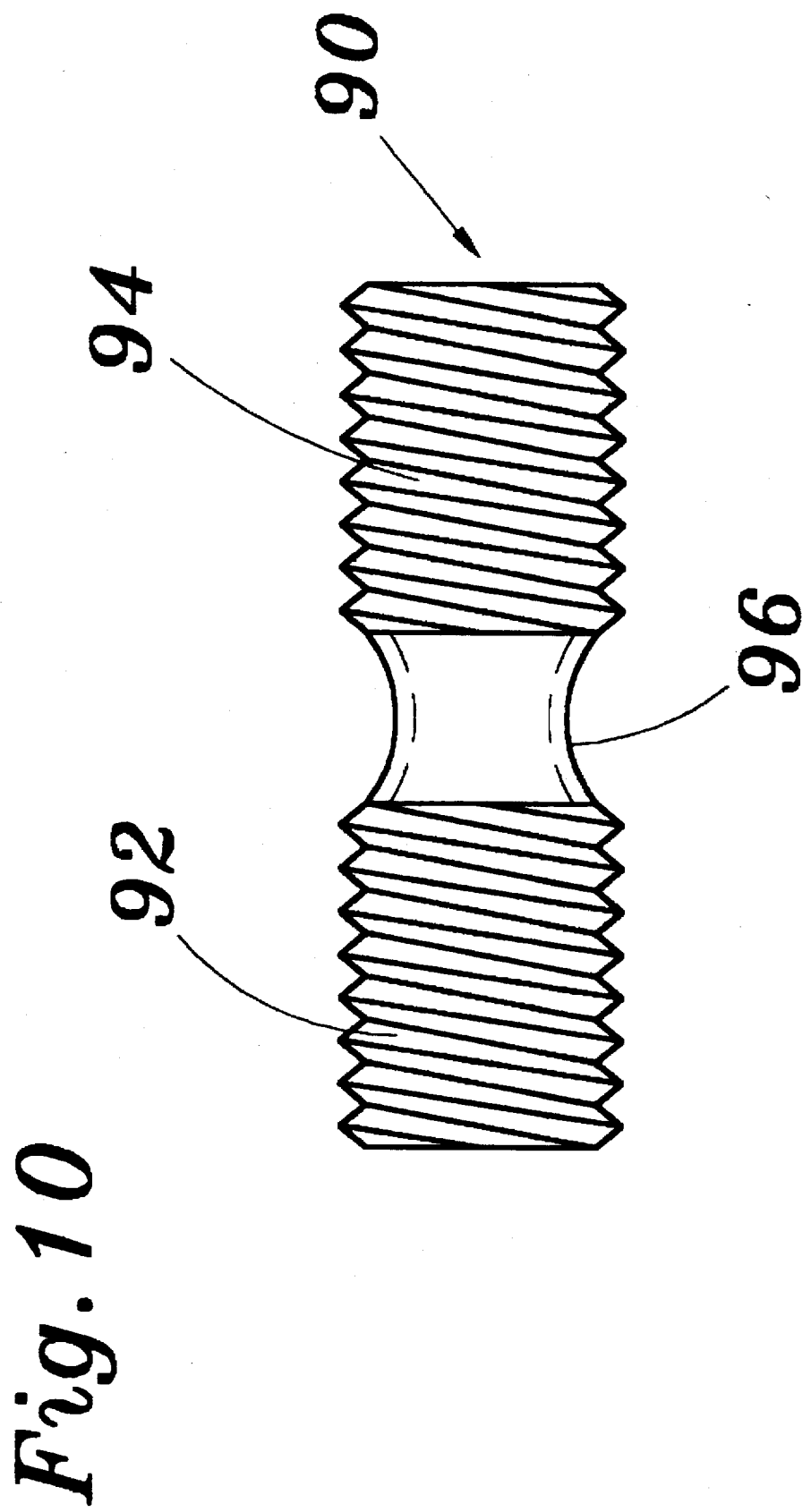
FIG. 10 shows in elevation a seventh embodiment screw gear somewhat similar to that shown in FIG. 7, but having externally, instead of internally, threaded ends.

Referring to FIG. 10, a seventh embodiment screw gear 90 somewhat similar to that shown in FIG. 7 is shown, but has externally, instead of internally, threaded ends 92 and 94 which, in this instance, have opposite, instead of the same, hands. The center has the threaded portion 96 to engage the standard thread screw.

Figure 11:
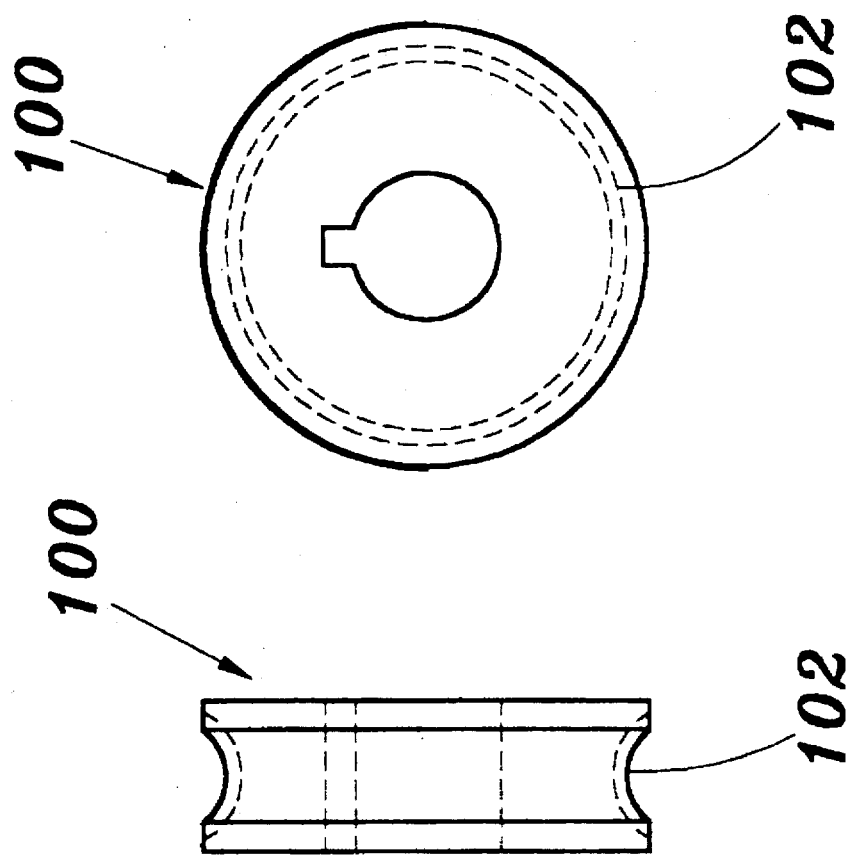
FIG. 11 shown in elevation an eighth embodiment screw gear similar to that shown in FIGS. 1 to 3, but without the standard thread screws.

Referring to FIG. 11, an eighth embodiment screw gear 100 having a threaded portion 102 is shown and is similar to that shown in FIGS. 1 to 3.

Figure 12:
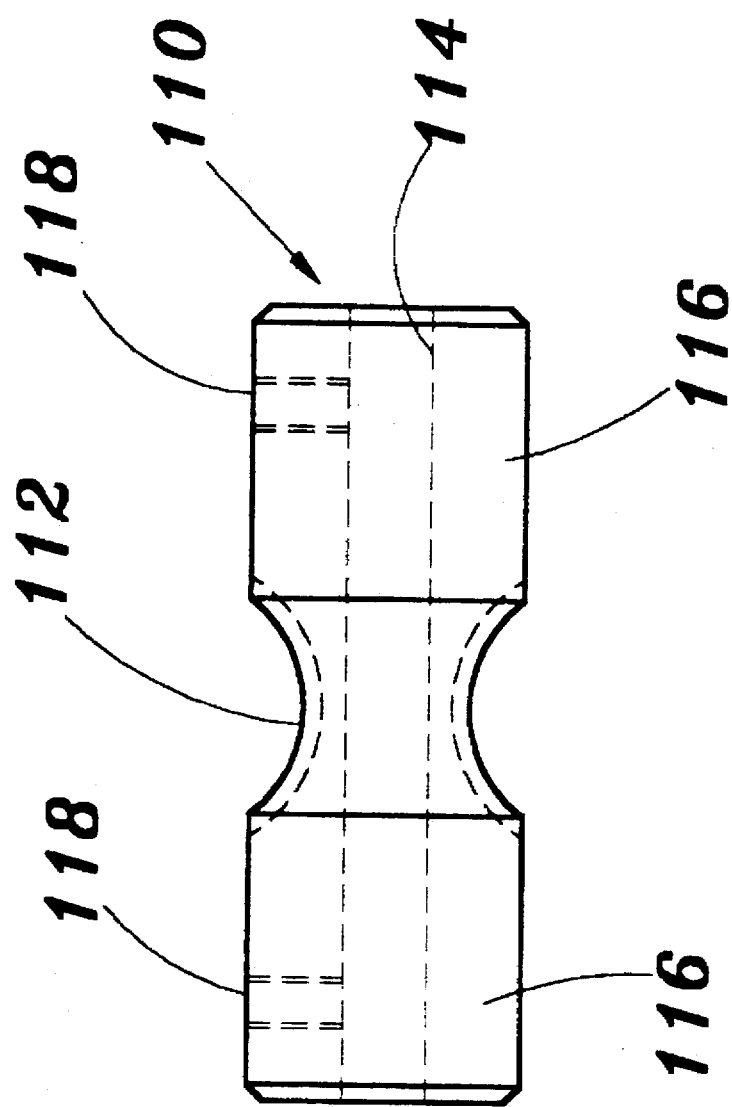
FIG. 12 shows in elevation a ninth embodiment screw gear somewhat similar to that shown in FIG. 7, except that it has an opening therethrough, instead of two internally threaded openings, and two set screws.
Figure 13:
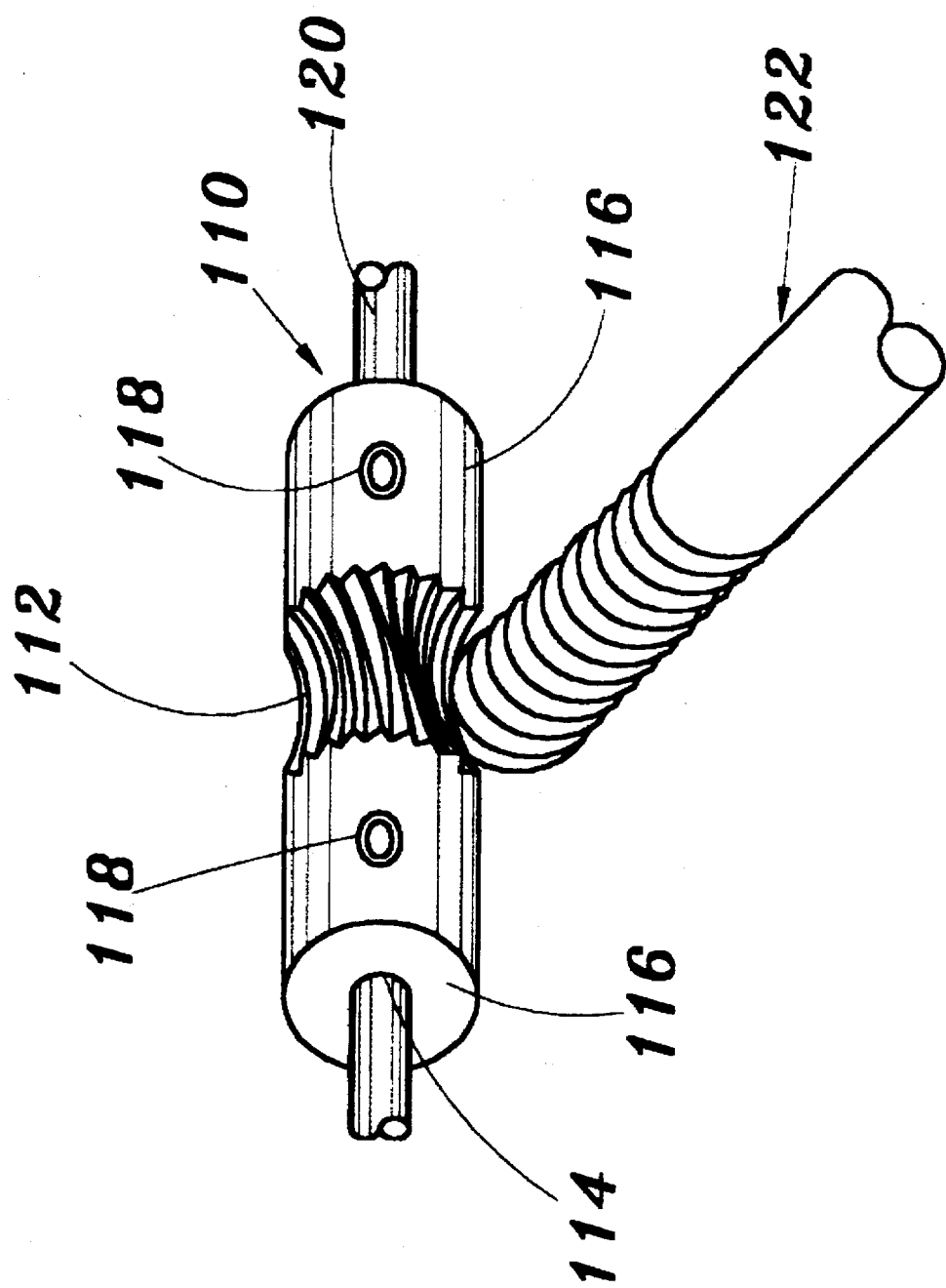
FIG. 13 illustrates in perspective the screw gear of FIG. 12 mounted on a shaft and held thereto by the set screws and shows the associated cooperating standard thread screw.
Figure 14:
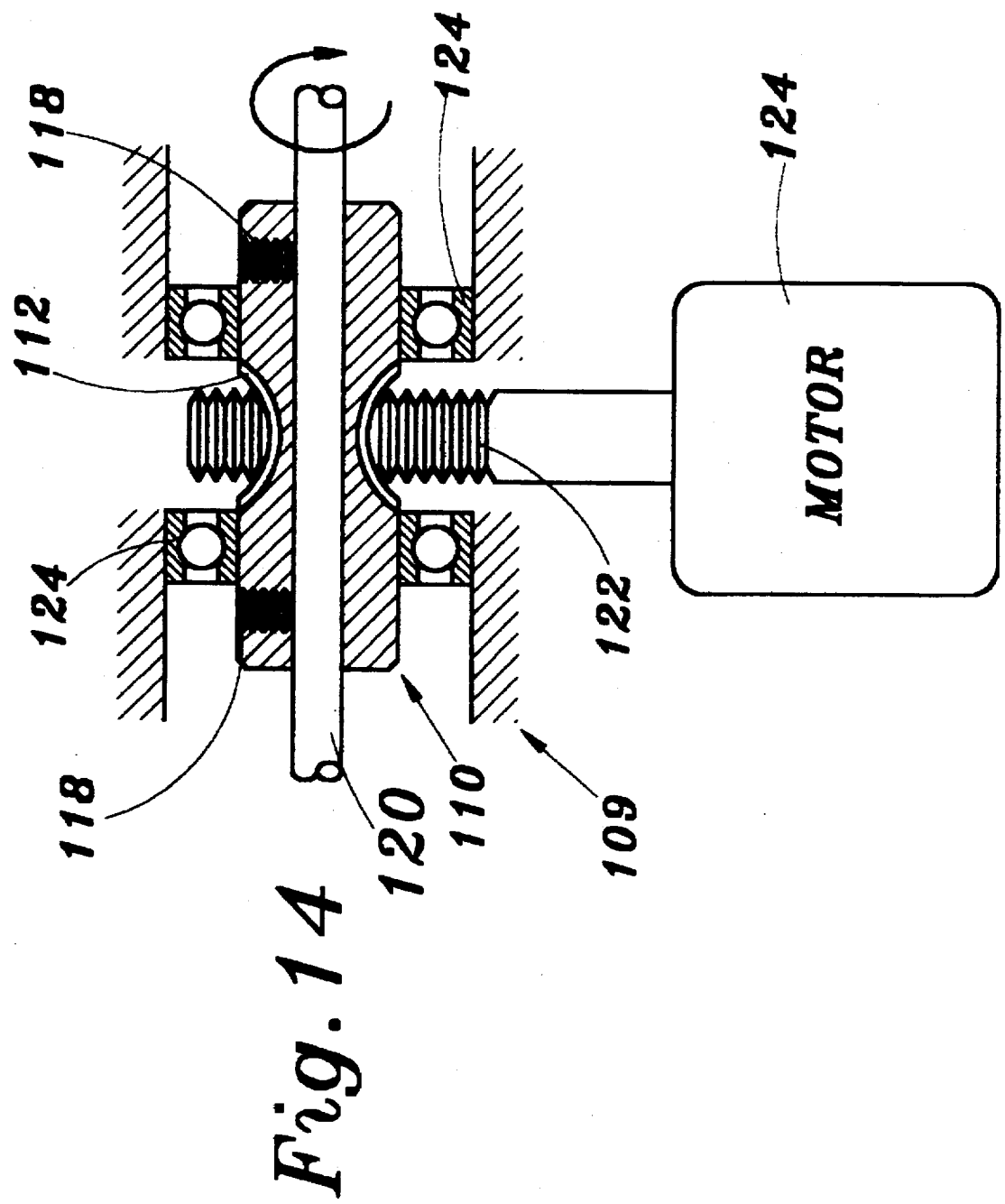
FIG. 14 shows in cross-section a mechanism utilizing the structures shown in FIGS. 12 and 13, whereby a motor can rotate the standard thread screw to cause rotation of the bearing mounted screw gear and the shaft connected thereto.

Referring to FIG. 12, a ninth embodiment screw gear 110 having a central threaded portion 112 somewhat similar to that shown in FIG. 7, is shown. The screw gear 110 has an opening 114 therethrough and long hub portions 116 and two set screws 118. Referring to FIG. 13, the screw gear 110 is shown mounted on a shaft 120 and held thereto by the set screws 118 and shows the associated cooperating standard thread screw 122. Referring to FIG. 14, a mechanism 109 utilizing the screw gear means 110 shown in FIGS. 12 and 13 is shown. A motor 124 can rotate the standard thread screw shaft 122 to cause rotation of the bearing (124) mounted screw gear 110 and the shaft 120 connected thereto.

Figure 15:
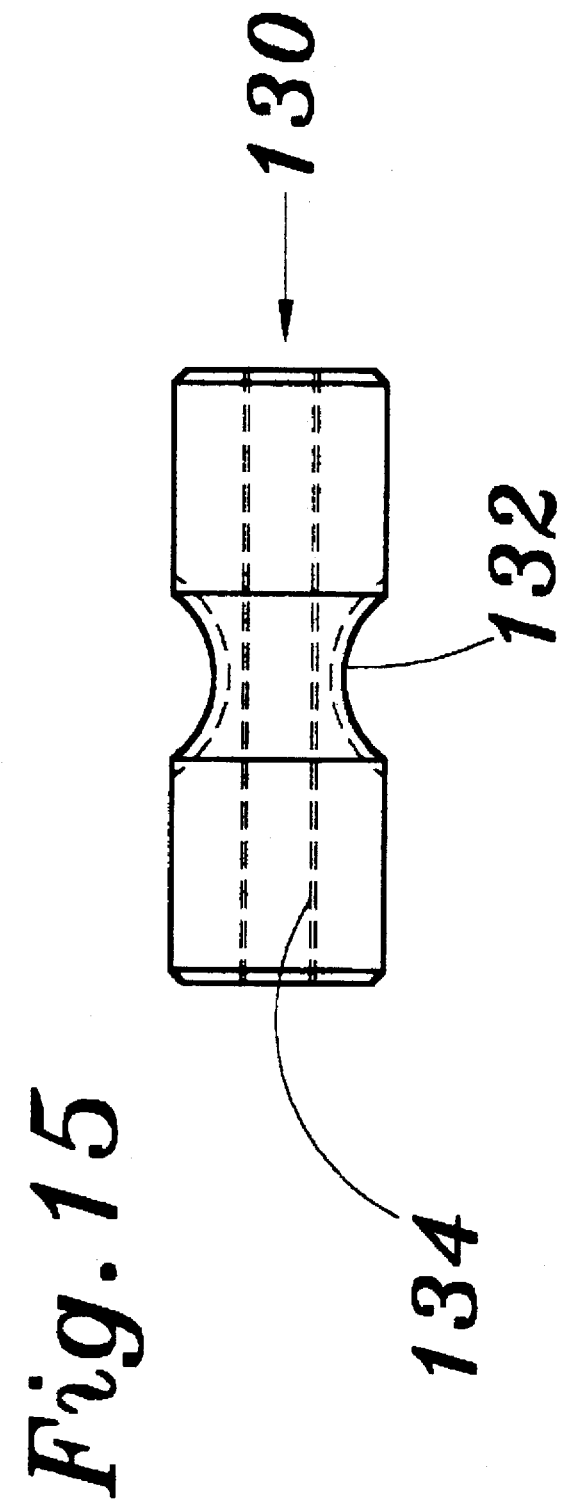
FIG. 15 illustrates in elevation a tenth embodiment of screw gear somewhat similar to that of FIG. 12, but without the set screws and with the central opening therethrough internally threaded.
Figure 16:
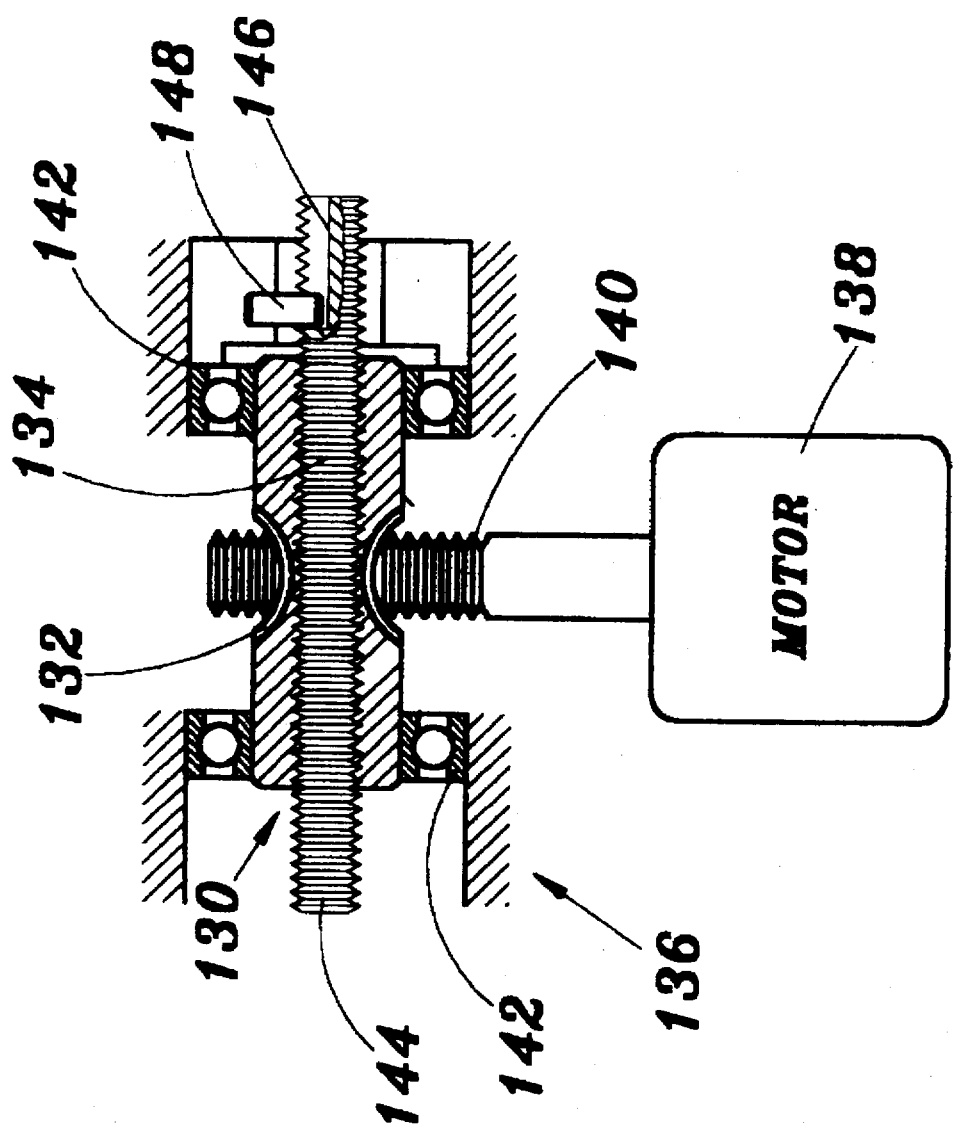
FIG. 16 illustrates in cross-section a mechanism utilizing the screw gear of FIG. 15, whereby a motor can rotate the bearing mounted associated standard thread screw to cause rotation of the screw gear and, in turn, relative movement to the right or left of the threaded rod engaged in the threaded central opening, the threaded rod having a slot engaging a pin which permits axial motion but prevents rotation.
Figure 17:
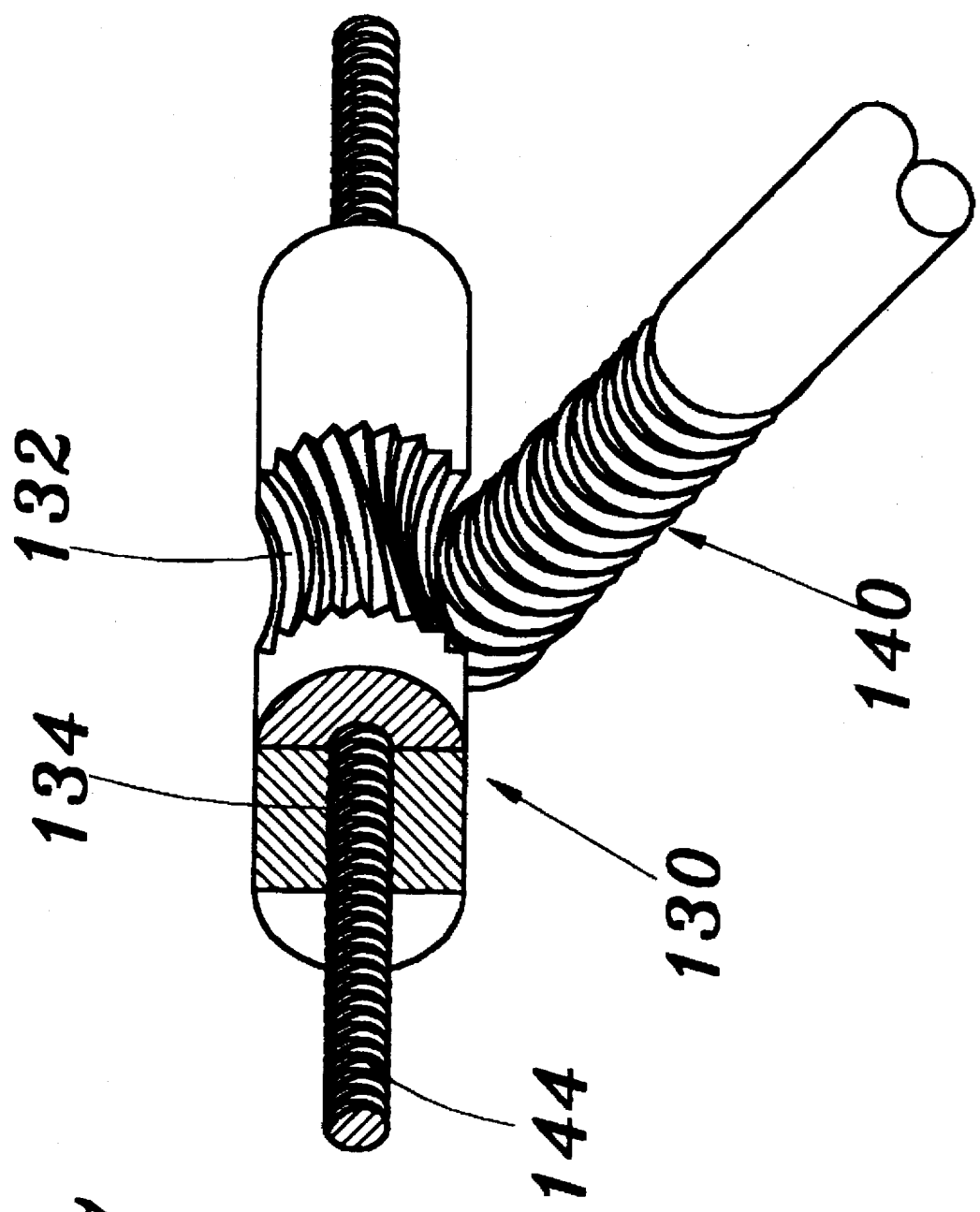
FIG. 17 shows in perspective the construction of the screw gear, the motor driven standard threaded screw shaft, and the threaded central rod of the FIG. 16 mechanism.

Referring to FIG. 15, a tenth embodiment of screw gear means 130 (with a threaded portion 132) somewhat similar to that of FIG. 12, but without the set screws, and with the central internally threaded opening 134 all the way therethrough is shown. Referring to FIG. 16, a mechanism 136 utilizing the screw gear 130 of FIG. 15 is shown. A motor 138 can rotate the bearing mounted (142) associated standard thread screw 140 to cause rotation of the screw gear 130 and, in turn, relative movement to the right or left of the threaded rod 144 engaged in the threaded central opening 134, the threaded rod 144 having rotation prevention means in the form of a slot 146 engaging a pin 148 in the housing which permits axial motion but prevents rotation of the threaded rod. Referring to FIG. 17, the screw gear 130, a portion of the motor driven standard threaded screw shaft 140, and the threaded central rod 144 of the FIG. 16 mechanism is shown.

Figure 18:
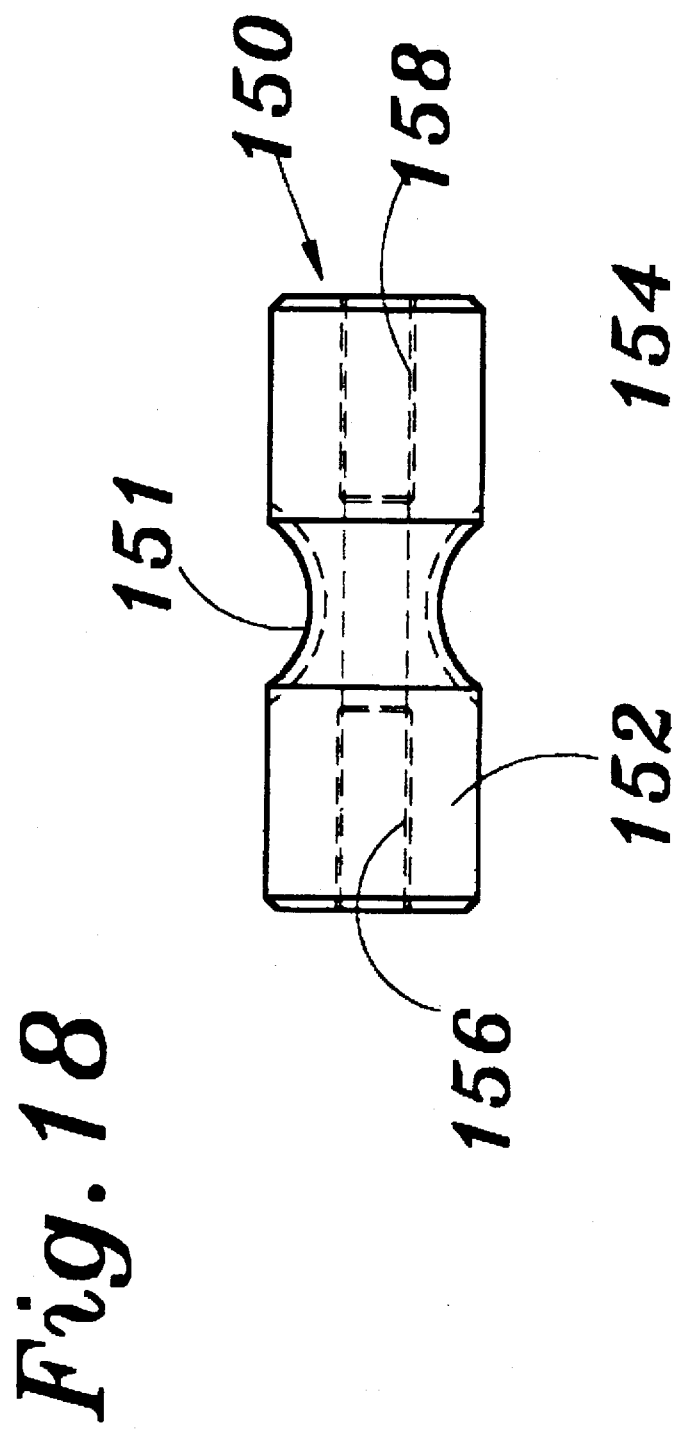
FIG. 18 shows in elevation an eleventh embodiment of screw gear somewhat similar to FIG. 15, but different in that each side is separately threaded, instead of being through threaded, with the same, different hand, or different size threads.
Figure 19:
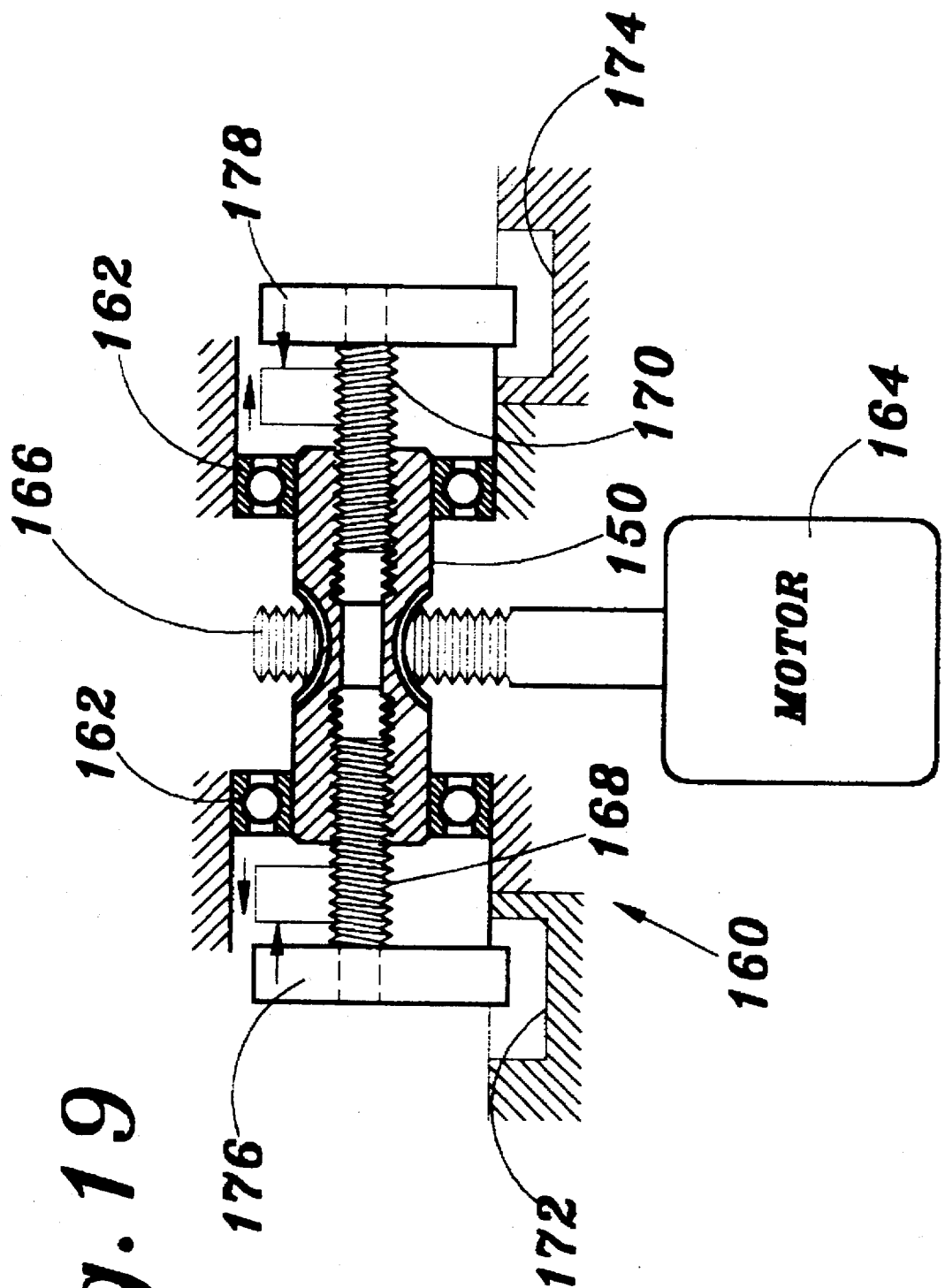
FIG. 19 illustrates in cross-section a mechanism utilizing a bearing mounted screw gear of FIG. 18 and a motor driven standard thread screw shaft similar to that shown in FIGS. 14 or 16 to move two opposite hand threaded rods carrying end slot engaging plates in or out from the screw gear.
Figure 20:
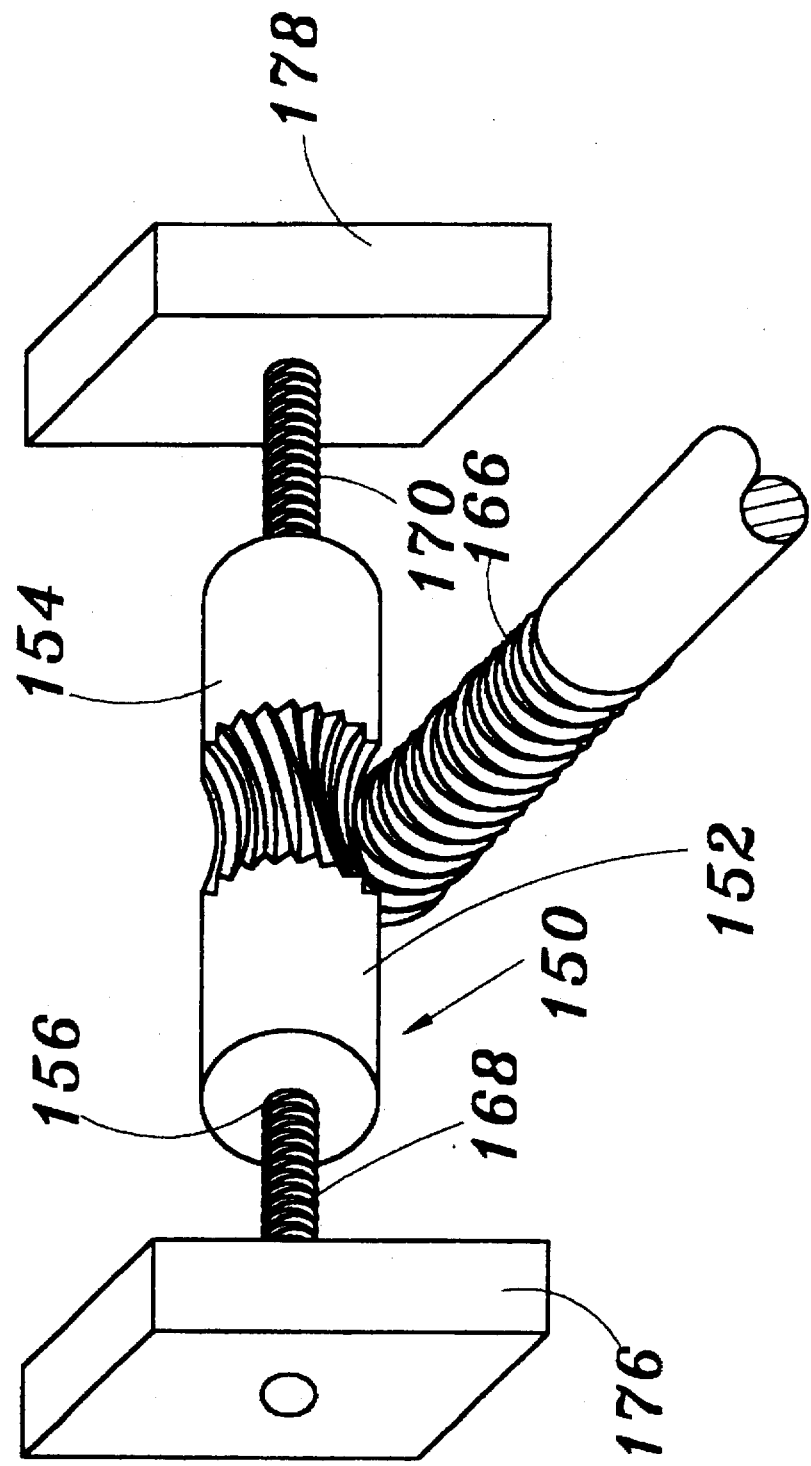
FIG. 20 is a perspective view of the screw gear, a portion of the standard thread screw motor shaft worm, and opposite hand threaded end rods carrying the plates of FIG. 19.

Referring to FIG. 18, an eleventh embodiment of screw gear means 150, somewhat similar to that of FIG. 15, with a screw portion 151, but different in that each side 152 or 154 has a separately threaded opening 156 or 158, in this instance, of different hand threads is shown. Of course, alternatively, the threads could be the same or different sizes. Referring to FIG. 19, a mechanism 160 utilizes a bearing mounted (162) screw gear 150 of FIG. 18 and a motor 164 driven standard thread screw shaft 166 to move two opposite hand threaded rods 168 and 170 carrying slot 172 and 174 engaging plates 176 and 178 in or out from the screw gear 150 as is shown in dotted lines. Referring to FIG. 20, the screw gear 150, a portion of the standard thread screw motor shaft 166 (worm), and opposite hand threaded end rods 168 and 170 carrying the plates 176 and 178 of mechanism 160 are shown.

Figure 21:
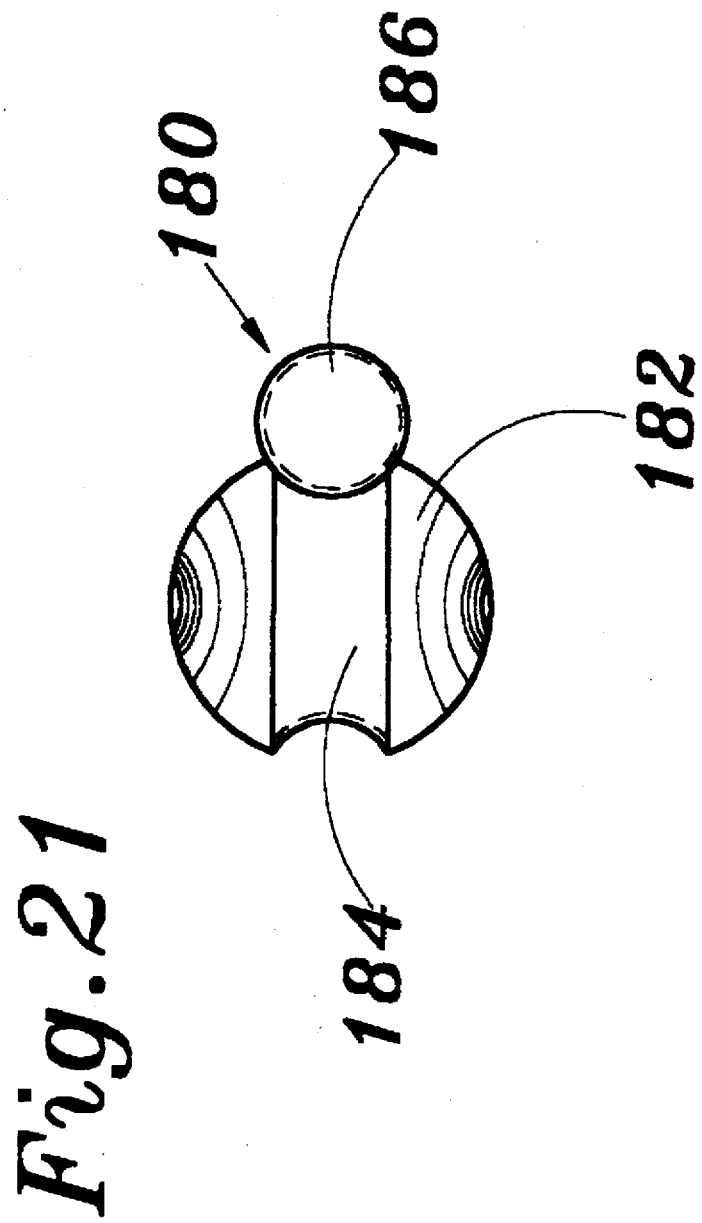
FIG. 21 is an elevational view of a twelfth embodiment having a spherical body in which a screw gear thread is formed and its cooperating standard thread screw.
Figure 22:
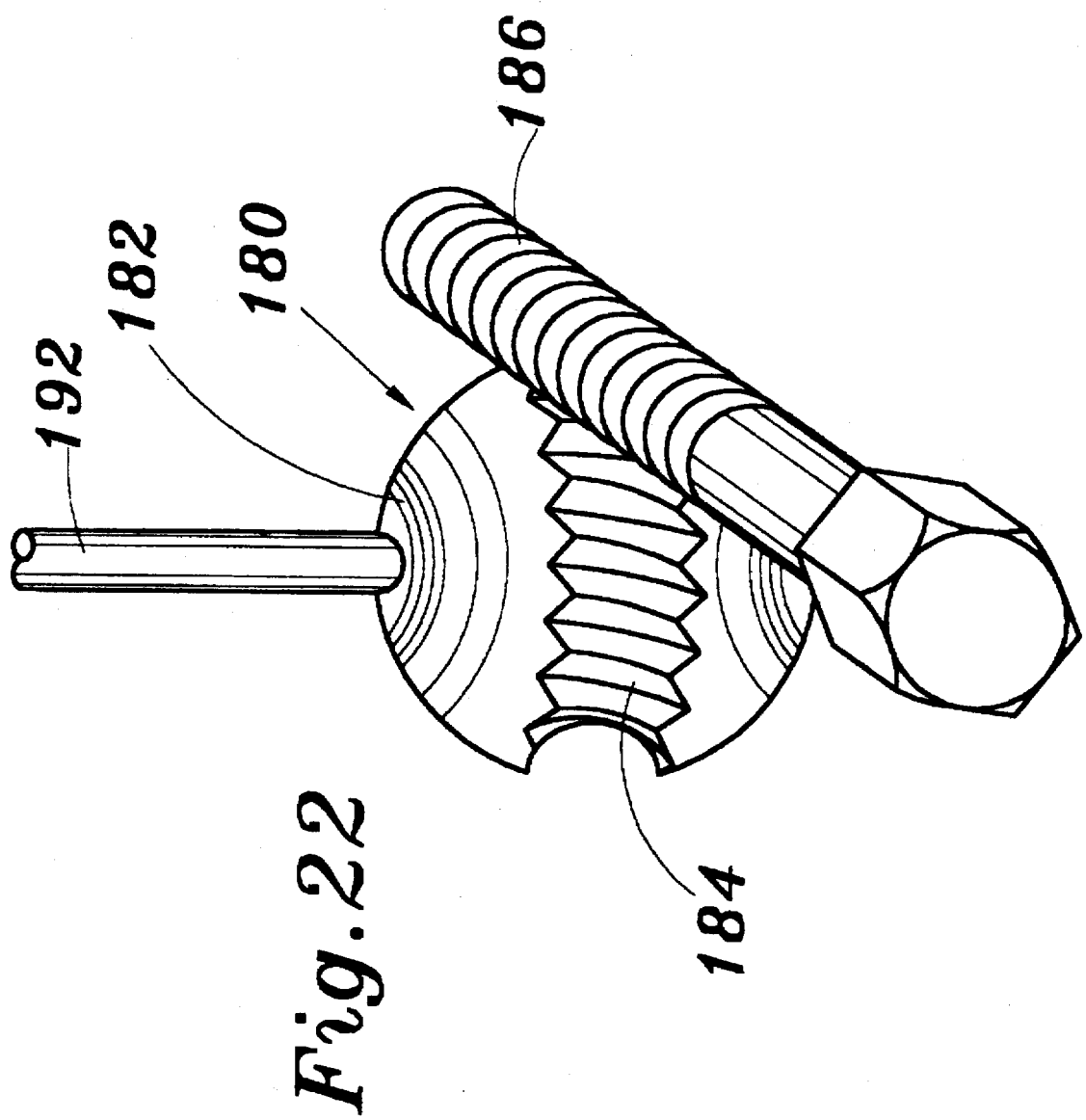
FIG. 22 is a perspective view of the screw gear and screw (worm) of FIG. 21.
Figure 24:
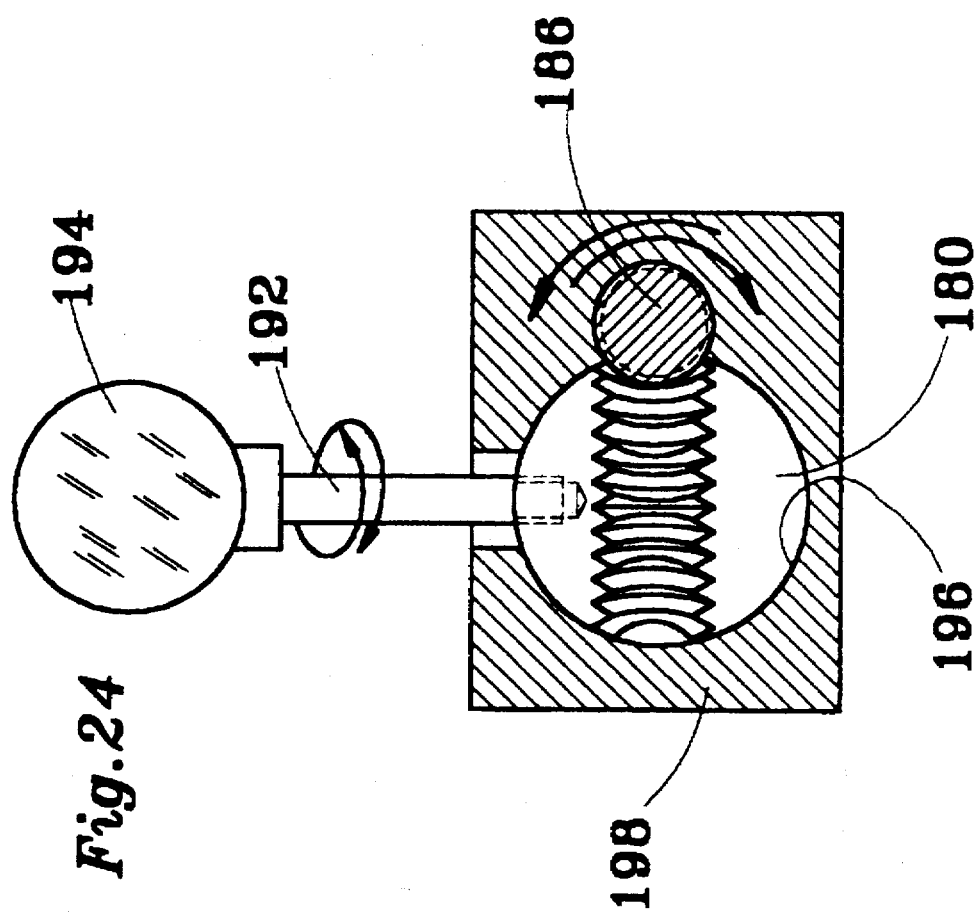
FIG. 24 is a cross-sectional view of the mechanism of FIG. 23 taken substantially along the line of 24—24 of FIG. 23.
Figure 23:
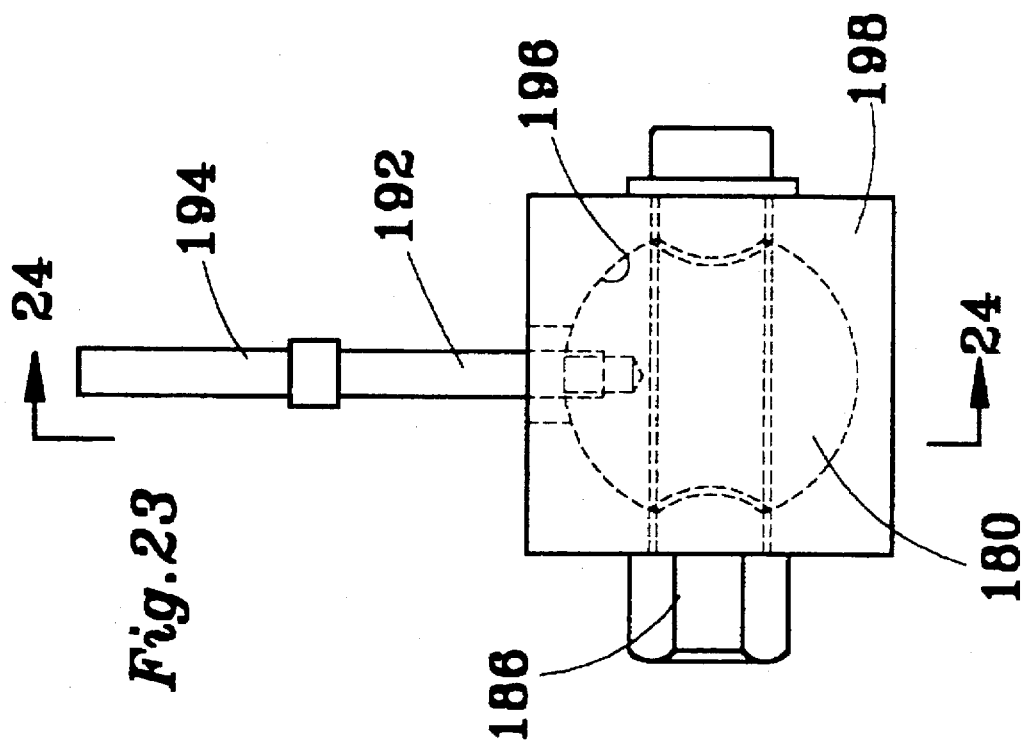
FIG. 23 is a mechanism for adjusting the position of a shaft mounted mirror carried by a screw gear and being operated by the standard thread screw of FIGS. 21 and 22.

Referring to FIGS. 21 and 22 a twelfth embodiment 180 has a spherical body 182 in which a screw gear thread 184 is formed which cooperates with a standard thread screw 186. FIGS. 23 and 24 is a mechanism 190 for adjusting the position of a shaft 192 mounted mirror 194 carried by the screw gear 180 and being operated by the standard thread screw 186 (worm). The screw gear 180 is mounted in a spherical socket 196 formed in the housing 198. As the screw 186 is turned it will turn the screw gear 180 and the mirror shaft 192 and the mirror 194.

Figure 26:
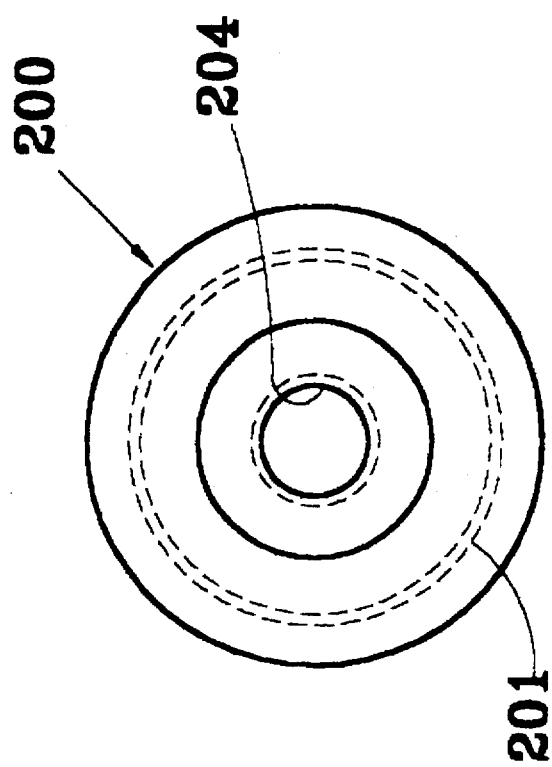
FIG. 26 is a side elevational view of the screw gear of FIG. 25.
Figure 25:
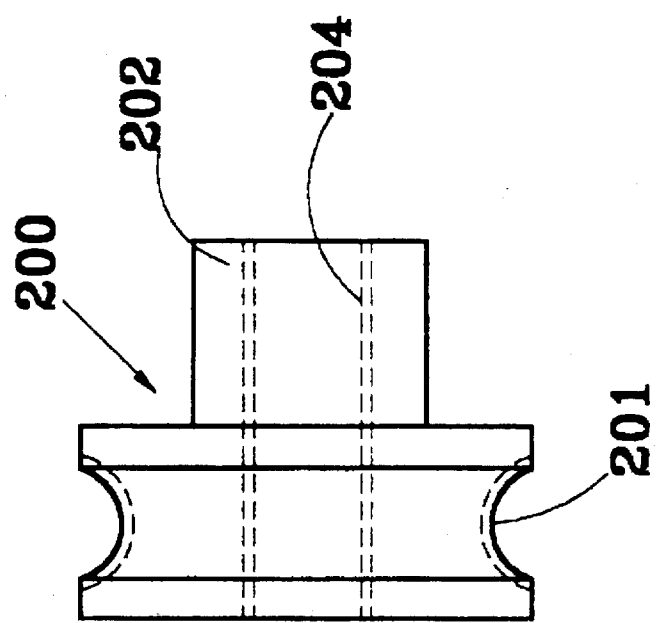
FIG. 25 is an elevational view of a thirteenth embodiment screw gear having a hub extending to one side with a threaded axial opening.
Figure 28:
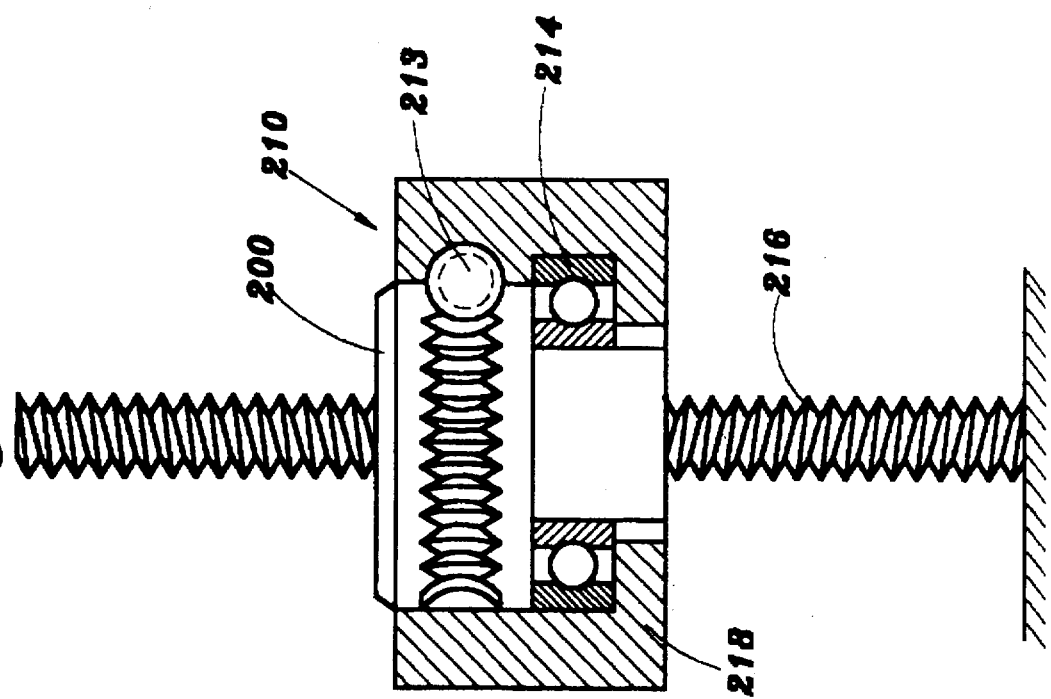
FIG. 28 is a cross-sectional view taken along the lines 28—28 of the FIG. 27 mechanism, with means for preventing rotation of the housing carrying the rotability mounted screw gear having been omitted for clarity.
Figure 27:
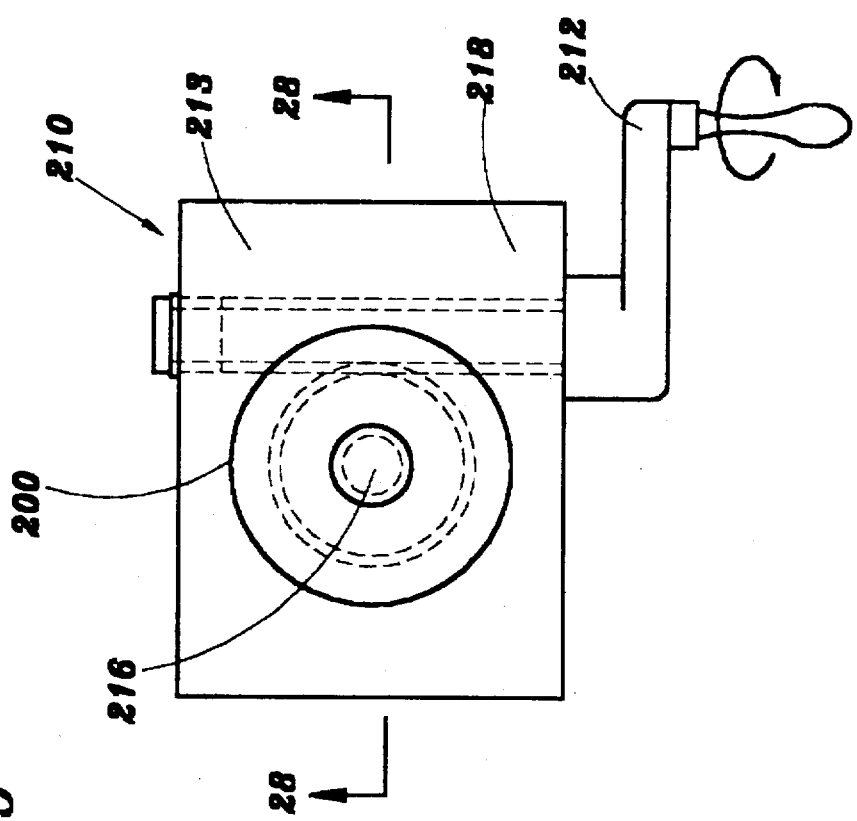
FIG. 27 is a top view of a mechanism utilizing the screw gear of FIGS. 25 and 26 to form a crank adjustment for moving the bearing mounted screw gear, relatively up and down on a threaded rod.

Referring to FIGS. 25 and 26, a thirteenth embodiment 200 screw gear has a threaded portion 201 and hub 202 extending to one side with a threaded axial opening 204. Referring to FIGS. 27 and 28, a mechanism 210 utilizes the screw gear 200 of FIGS. 25 and 26 to form a crank operated adjustment. The crank (carrying the standard threaded screw 213) moves the bearing mounted (214) screw gear 200 relatively up and down on a threaded rod 216. Of course, means for preventing rotation of the housing 218 carrying the rotatability mounted screw gear 200 is required, but have been omitted for clarity. FIG. 29 shows the screw gear 200 and the crank 212 carrying the standard thread screw 213.

FIG. 30 shows another mechanism, similar to that shown in FIG. 28, but Voith a keyway 220 formed in the central threaded rod engaging a pin 222 to keep the housing 218 from rotating.

Figure 31A:
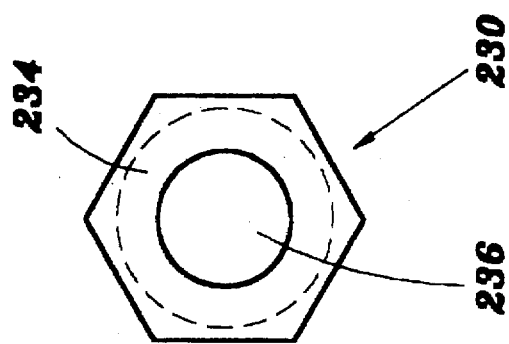
FIG. 31A is an end elevation of the hexagonal bodied screw gear shown in FIG. 31.
Figure 31:
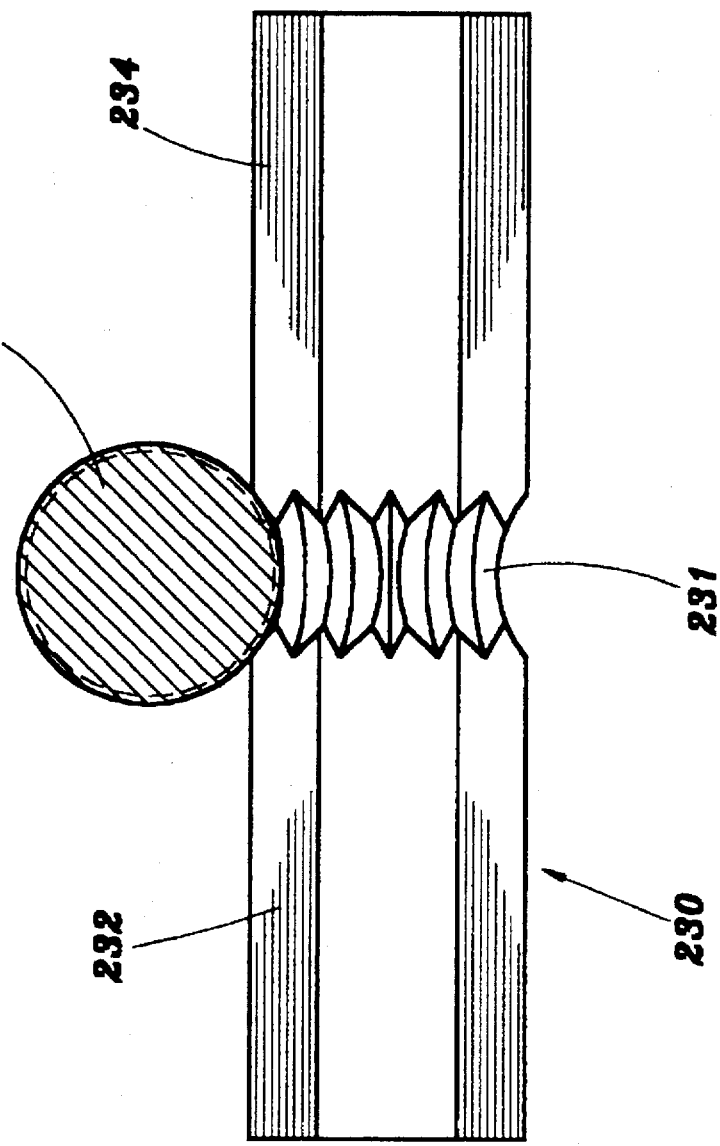
FIG. 31 is an elevational view of a fourteenth embodiment of screw gear having at least one and, in this instance, two side extending hub portions of non-round, hexagonal in this instance, shapes with a central opening which may or may not be threaded.

Referring to FIG. 31, a fourteenth embodiment of screw gear 230 has a threaded portion 231, engageable with the standard thread screw 233, and at least one and, in this instance, two side extending hub portions 232 and 234, of non-round, hexagonal in this instance, shapes with a central opening 236 which may optionally be threaded.

Figure 33:
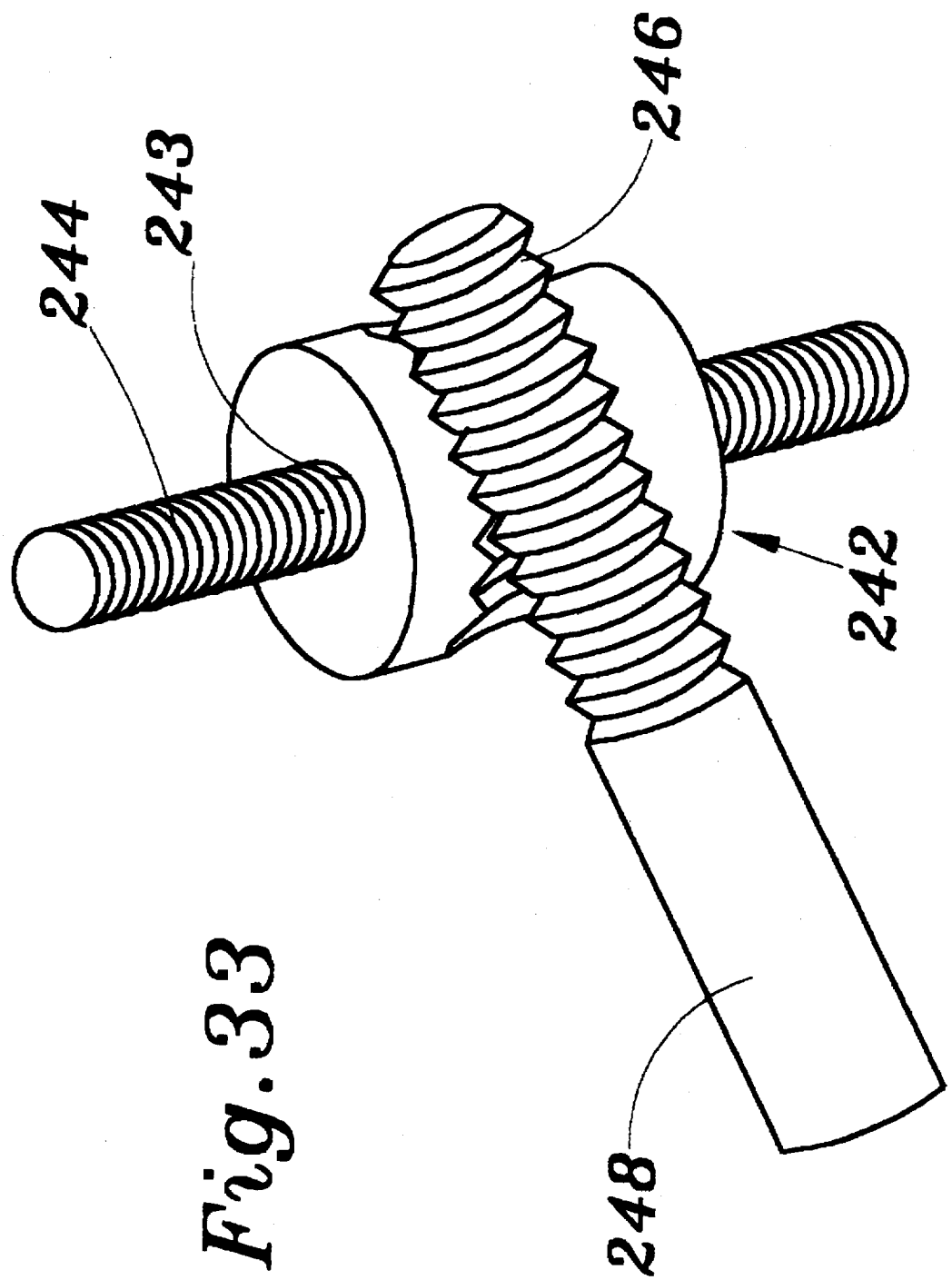
FIG. 33 is a perspective view of the screw gear, standard thread screw worm and fixed thread rod of FIGS. 32 and 32A.

Referring FIG. 32, a motorized sliding mechanism 240 has a fifteenth embodiment screw gear means 242 rotatably mounted by its threaded center opening 243 and threaded on a fixed threaded rod 244. The standard thread screw (worm) 246 is formed on the end in the motor shaft 248. The motor 250 is mounted to slide along on an elongated slide 252 parallel to the fixed threaded rod 246 in a manner that rotation of the shaft 248 of the motor 250 moves the screw gear 242 along the threaded rod 246, which then causes the motor shaft 248 and motor 250, itself, to slide along the side 252. FIG. 33 shows in more detail in perspective the screw gear 242, standard thread screw (worm) 246 and fixed thread rod 244.

Figure 36A:
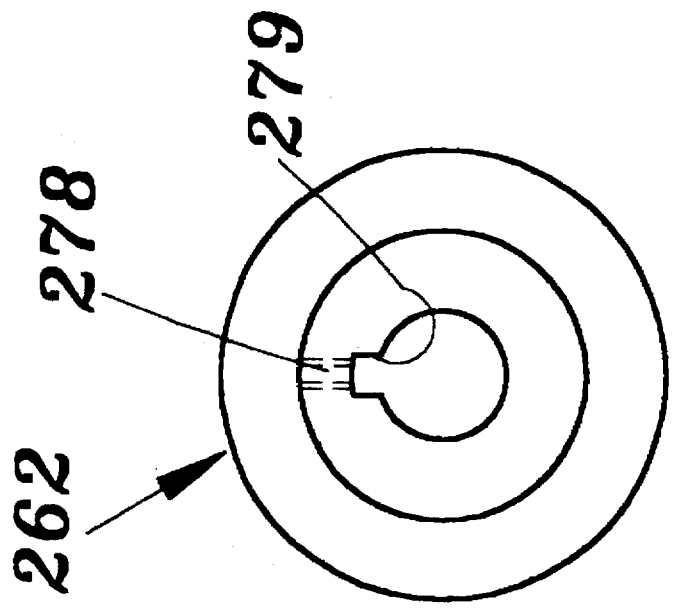
FIG. 36A is a side elevational view of the screw gear of FIG. 36.
Figure 36:
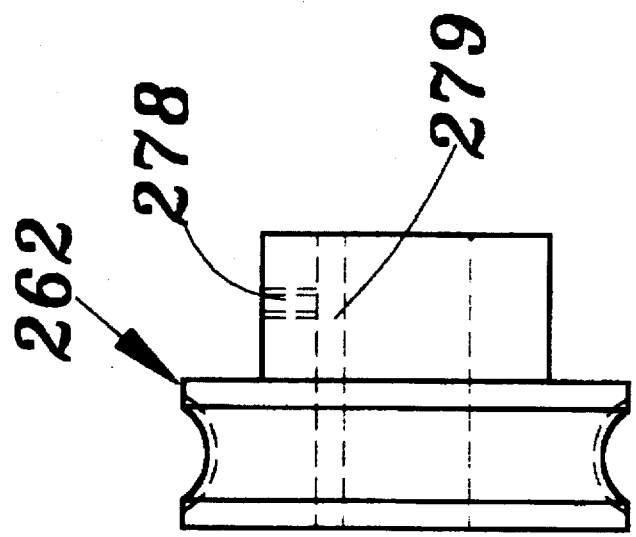
FIG. 36 is an elevational view of the screw gear of FIGS. 34 and 35.

Referring to FIGS. 34 and 34, an adjustment mechanism 260 having a screw gear 262 similar to that shown in FIGS. 4 and 5, is shown. The gear 262 can be rotated by a piloted end 264 allen head bolt 266 standard thread screw (worm) to cause the screw gear 262, which is rotatably mounted in a hollow housing 268 such as a chair leg, to move a thread rod 270. The thread rod 270 is held to the screw gear, as by an allen screw 272, and extends through threaded openings 274 and 276 in both the screw gear 246 and housing 268 so as to move up and down to, say, level the chair leg. The screw gear 262 of mechanism 260 is separately shown in FIGS. 36 and 36A and has a set screw 278 and, alternatively could have a keyway 279 cooperable with a key (not shown) to hold the screw gear to the rod 270.

Figure 37:
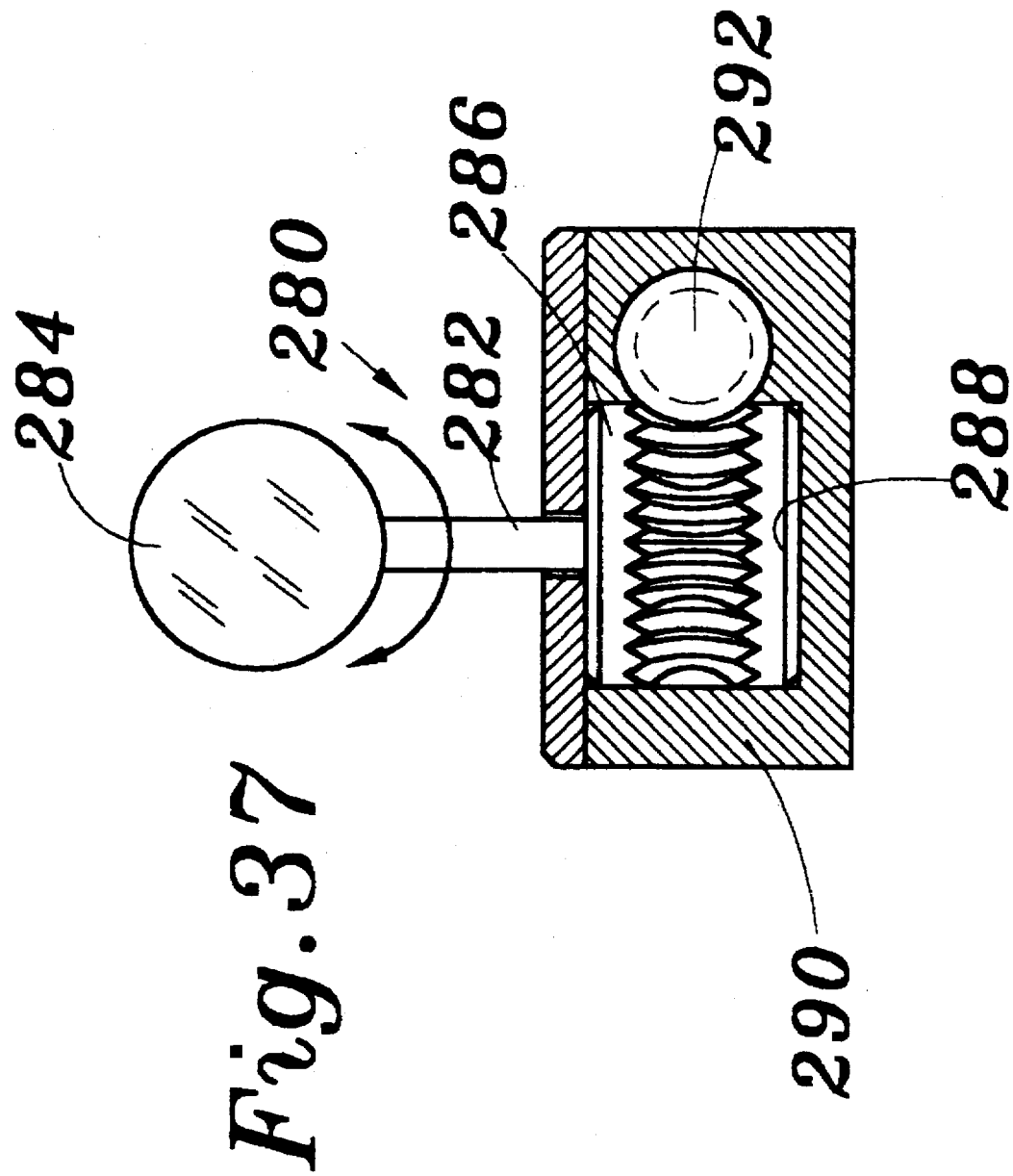
FIG. 37 is a cross-sectional view of another adjustment mechanism, in this instance for a staff mounted mirror which is carried by a cylindrical screw gear mounted in a housing and operable by its standard thread screw worm.

Referring to FIG. 37, another mirror adjustment mechanism 280, in this instance for a staff 282 mounted mirror 284, is shown. The shaft 282 is carried by a cylindrical screw gear 286 mounted in a recess 288 of the housing 290, and is operable or rotatable by its standard thread (worm) screw 292.

Figure 38:
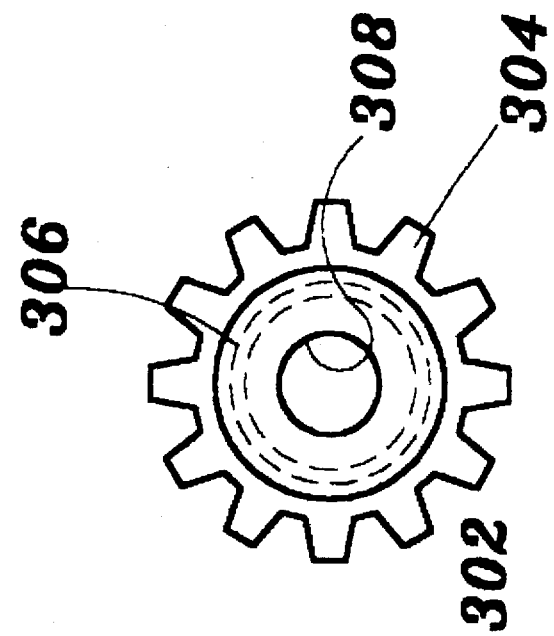
FIG. 38 illustrates in elevation a sixteenth embodiment screw gear which carries a conventional gear with the hub having an opening therethrough.
Figure 38A:
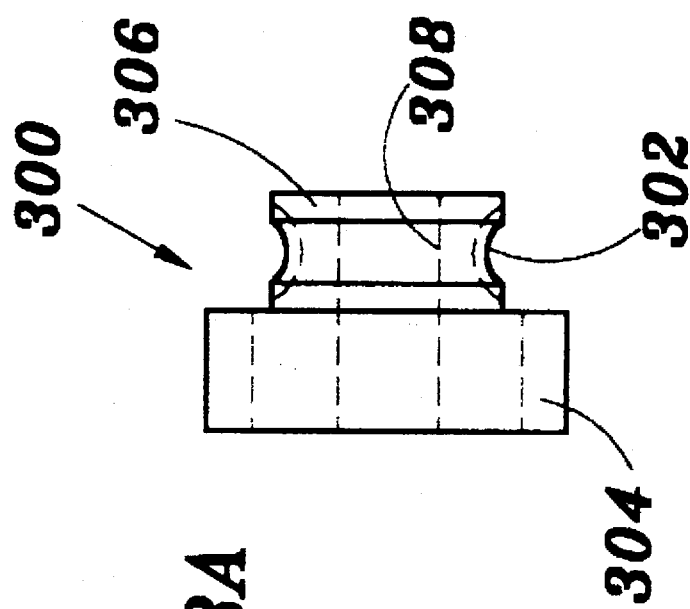
FIG. 38A is a side elevation of the gear-screw gear of FIG. 38.

In FIG. 38, a sixteenth embodiment screw gear means 300 carries a threaded portion 302 and a conventional gear 304 with the hub 306 having an opening 308 therethrough.

Referring to FIGS. 39 and 39A, a mechanism 310, such for example for indexing, has a seventeenth embodiment screw gear 312 rotatably mounted by a bearing 314 in a housing 316. The screw gear 312 is operable by its standard thread screw (worm) 318. The gear 312 carries an outer plate 320 with a plurality of article mounting holes 322. Rotation of the screw 318 will cause the plate 320 to index. If desired, the screw 318 and housing opening therefor could be constructed to permit linear motion of the screw 318 relative to the screw gear 312 so that the screw 318 and screw gear 312 operate in the manner of a rack and pinion to permit more rapid adjustments than in a gear and worm mode.

Referring to FIG. 40, an eighteenth embodiment 330 of a screw gear 332 cylindrical body has a screw portion 333 and an internal, in this instance, hexagonal opening 334.

FIGS. 41 and 42 show a mechanism 340 which can function as a rotary actuation (rack and pinion) and/or a locking mechanism having a housing 340a and bore 340b carrying a screw gear 342 (pinion) which in turn engages with two standard thread screws 344 and 346 (which can function as racks). Rotation of one or the other screw 344 or 346 causes rotation of the screw gear 342 and linear motion of the other screw 346 and 344. Linear motion of one screw 344 or 346, cause rotation of the screw gear and linear motion of the other screw 346 or 344. The screw gear 342 has a rotatable shaft 348 affixed thereto. Various portions of this mechanism could be power operated or manually operated. The screw gear 342 has a body which has a hub portion extending from one side thereof; the screw gear body 342 cooperating with the two (first and second) standard thread screw elements 344 and 346, as described above. Each of the standard thread screw elements 344 and 346 has a threaded portion for engaging the threaded portion on the screw gear body and a non-thread position which can be provided with means for turning the screw, and, in turn, the screw gear. The mechanism itself has a housing which rotatably mounts the screw gear 342 and carries the two screw elements 344 and 346 in openings or bores therein for rotation and axial movement.

Figure 44:
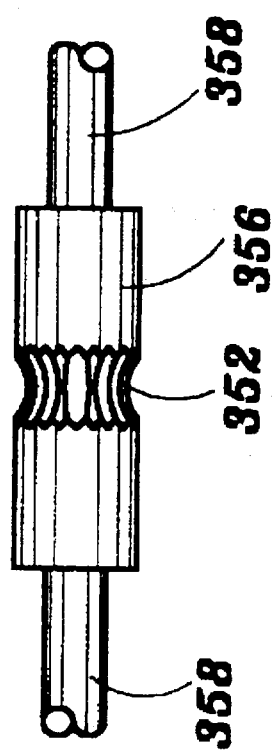
FIG. 44 is an elevational view of a screw gear of the present invention formed in an enlarged portion of a stepped rod.
Figure 43:
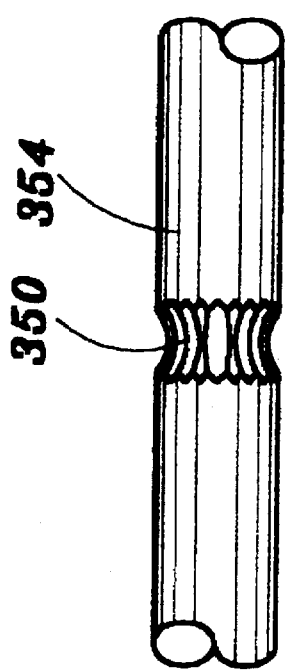
FIG. 43 is an elevational view of a screw gear of the present invention formed on a rod.

FIGS. 43 and 44 show a screw gear thread 350 or 352 of the present invention formed on a rod 354 or 356, the latter being stepped to have smaller diameter ends 358.

Figure 45:
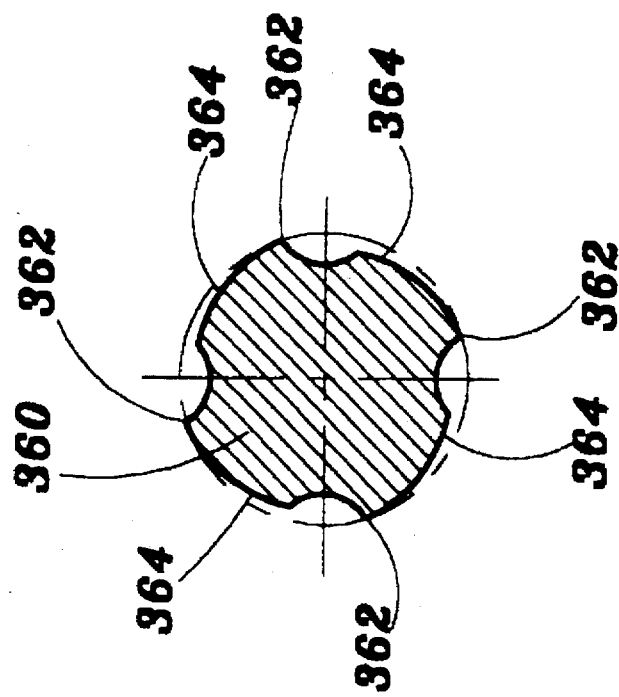
FIG. 45 is a cross-sectional view of a standard thread screw tap showing the manner in which it can be modified to lessen undercutting of the threads on the screw gear when the tap is used to cut the threaded portion thereon.

FIG. 45 is a cross-sectional view of a standard thread screw tap 360 (in this instance right-hand tap) showing the manner in which it can be modified to lessen undercutting of the threads on the screw gear when the tap is used to cut the threaded portion thereon. The leading edge 362 of the tap is made sharp, while the trailing edge 364 is cut back. The depth of the cut back depends upon the diameter of the screw blank and thread size, the greater the latter and the smaller the former the less cut back needed to prevent undercutting of the threaded portion of the screw gear when forming the same.

Figure 48:
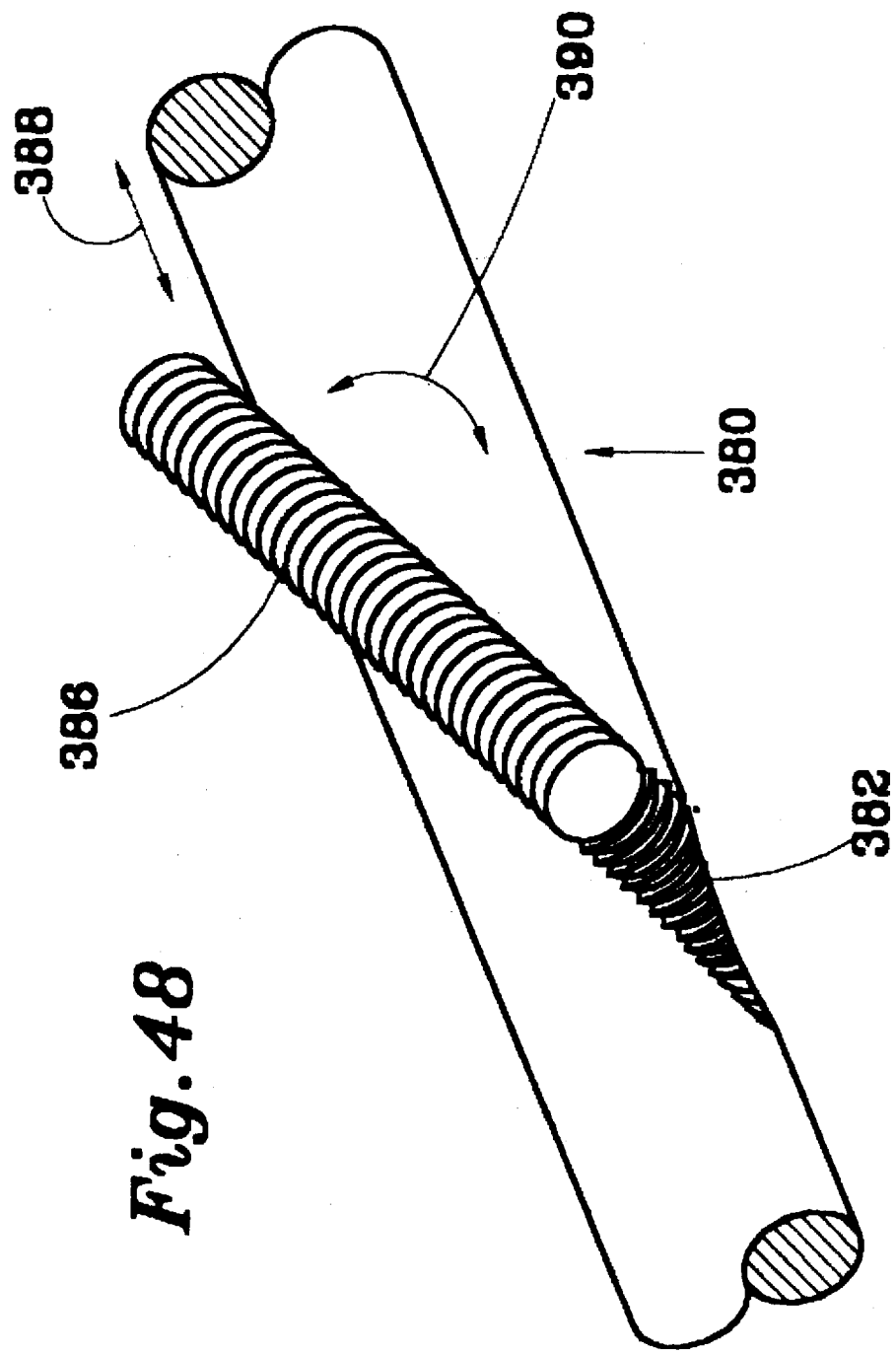
FIG. 48 is a perspective view of screw gear formed on a rod which has a threaded portion that extends on the periphery of the rod in both radial and axial directions, the associate standard thread screw being shown in dashed for clarity.

Another version of screw gear 380 is shown in FIG. 48. Unlike the prior screw gears which had the threaded portion extending on the periphery or circumference radially about the same, the screw gear 380 has a threaded portion 382 which, in addition, extends axially, i.e., has both a radial and axial component. Thus, the threaded portion 382 could be, for example, of a helical or spiral form and extend along the axial length of the screw gear which would permit the mechanism to act like a cam. Thus, were the screw gear 380 engaged by a standard thread screw 386 which would be mounted in a housing not shown for rotation or linear motion or both, it would be possible by rotation of the screw 386 to both rotate the rod 380 and cause it to move axially as is indicated by the arrows 388 and 390. Additionally, if for example, the rod 380 was rotated and free to move axially, it would cause the rod 380 to move axially and the screw 386 to move linearly. The multiple motions possible with this simple mechanism gives the designer many new choices on how to solve design problems he faces.

FIGS. 46 and 47 are schematic views showing how any one of the screw gears described, here referred to as 370, of the present invention may have its threaded portion 372 thereon formed by a conventional tap 374 mounted in a milling machine. Of course, the tap could be modified as discussed above if undercutting is a problem. As shown the screw gear blank 370 is mounted say by a bolt or axle 376 on a jig 377 so it can rotate. The tap 374 can be turned by the milling machine head 378. The jig 377 can be moved relatively toward the tap 374 by the movement of the milling machine table 378 as is conventional. After initial contact is made between the tap and the blank as mentioned above, the rotation of the tap will cause the blank to rotate and feed itself into the tap, and such action will continue for the remainder of full rotation to complete cutting of thread of the screw gear around its full periphery. In this instance, such movement may be caused manually by the crank 380, but of course the entire operation could be automated and or carried on other type machinery. To better illustrate the thread cutting in FIG. 378, the edge of the body of the screw gear 370 was broken away on a line indicated by the numeral 382.

While the preferred embodiments of the screw gear and standard thread screw which can function as a worm and gear and/or rack and pinion have been illustrated and described and some of the methods for making the threaded portion of the screw gear have been illustrated and described, some of the mechanism for using the same have also illustrated and described, from the foregoing is should be understood that variations, modifications and equivalent elements and method steps fall within the scope of the appended claims.

What is claimed is:

1. A screw gear for threaded engagement with a straight standard size machine screw having a plurality of consecutive, adjacent straight standard machine screw threads thereon of one of the following standard family of screw threads: American National Unified Threads (UN, UNC, NC, UNF, NF, UNEF, NEF, UNREF), Unified Screw Threads, American Standard Threads, American National Standard Metric Screw Threads (General Purpose, Mechanical Fastener, Fine Pitch), British Withworth Screw Threads, British Standard Fine Screw Threads, British Association Screw Threads, Straight Pipe Threads, British Standard Metric Threads, Lowenherz Threads, and SAE Threads, said standard thread machine screw having a non-threaded portion located adjacent its threaded portion, and means on said non-threaded portion for turning said screw, said standard thread machine screw extending only from its threaded portion to said non-threaded portion, said screw gear comprising a screw gear body with an axis of relative rotation perpendicular to said screw and having a peripheral portion, at least a plurality of semi-circular or less threads of said same one of said family of screw threads formed in an arcuate, curved path extending about said screw gear body on said peripheral portion of said screw gear, said plurality of semi-circular or less threads of said screw gear being threadedly engaged with said straight, standard machine screw threads of said screw, relative movement of one of said screw gear and said straight, standard machine screw threads on said screw causing through cooperative thread engagement relative movement of the other of said screw gear and said straight, standard machine screw threads on said screw, whereby relative rotation of said screw gear causes relative linear motion of said straight, standard machine screw threads on said screw or alternatively relative linear motion or rotation of said straight, standard machine screw threads on said screw causes relative rotation of said screw gear.

2. An adjusting mechanism comprising a screw gear and a standard thread machine screw element of one of the following standard family of screw threads: American National Unified Threads (UN, UNC, NC, UNF, NF, UNEF, NEF, UNREF), Unified Screw Threads, American Standard Threads, American National Standard Metric Screw Threads (General Purpose, Mechanical Fastener, Fine Pitch), British Withworth Screw Threads, British Standard Fine Screw Threads, British Association Threads, Straight Pipe Threads, British Standard Metric Threads, Lowenherz Threads, and SAE Threads, said standard thread machine screw element having a non-threaded portion, said non-threaded portion being located adjacent its threaded portion, said screw gear comprising a screw gear body having an axis of relative rotation with respect to said standard threaded machine screw element, said standard threaded machine screw element having its own axis of relative rotation with respect to said screw gear, a peripheral portion on said screw gear body of said screw gear extending away from the axis of relative rotation of said screw gear and from the axis of rotation of said standard threaded machine screw dement, at least a plurality of semi-circular or less segment threads of said same one of said standard family of screw threads formed in a curved path on said peripheral portion extending about said screw gear body and axis of relative rotation of said screw gear, said plurality of semi-circular or less segment threads on said screw gear peripheral portion being compatibly, cooperatively and threadedly engaged with the threads on said standard thread machine screw element, rotational movement of said screw gear relative to said standard machine screw element causing though said cooperative threaded engagement linear motion of said standard machine screw element relative to said screw gear, alternatively linear or rotational movement of said standard machine screw element causing through said cooperative threaded engagement rotational motion of said screw gear relative to said standard machine screw element, whereby one of said screw gear and standard machine screw element may be moved to adjust the position of the other of said screw gear and standard machine screw element.

3. A mechanism as in claim 2, wherein said screw gear body has opening (24) therein on its said axis of rotation.

4. A mechanism as in claim 2, wherein said screw gear body has at least one hub portion (30) extending from said threaded portion on said peripheral portion.

5. A mechanism as in claim 2 wherein said standard thread machine screw element is capable of linear motion and said screw gear can be rotated by linear motion of said standard thread machine screw element so the screw gear and standard thread machine screw element function as a rack and pinion to provide a course adjustment, and wherein said standard thread machine screw element is also capable of rotating motion and said screw gear can be rotated by rotation of said standard thread machine screw element so the screw gear and standard thread machine screw element function also as a worm and worm gear to provide a fine adjustment.

6. An adjustment mechanism comprising a screw gear and a standard thread machine screw element of one of the following standard family of screw threads: American National Unified Threads (UN, UNC, NC, UNF, NF, UNEF, NEF, UNREF, NEF), Unified Screw Threads, American Standard Threads, American National Standard Metric Screw Threads (General Purpose, Mechanical Fastener, Fine Pitch), British Withworth Screw Threads, British Standard Fine Screw Threads, British Association Threads, Straight Pipe Threads, British Standard Metric Threads, Lowenherz Threads, and SAE Threads, said standard thread machine screw element having a non-thread portion, said non-threaded portion being located adjacent its threaded portion, said screw gear comprising a body having an axis of relative rotation with respect to said standard threaded machine screw element, said standard threaded machine screw element having its own axis of relative rotation with respect to said screw gear, a peripheral portion on said body of said screw gear extending away from the axis of relative rotation of said screw gear and from the axis of rotation of said standard threaded machine screw element, at least a plurality of semi-circular or less segment threads of said same one of said standard family of screw threads formed in a curved path on said peripheral portion extending about said body and axis of relative rotation of said screw gear, said plurality of semi-circular or less segment threads on said screw gear peripheral portion being compatibly, cooperatively and threadedly engaged with the threads on said standard thread machine screw element, rotational movement of said screw gear relative to said standard machine screw element causing though said cooperative threaded engagement linear motion of said standard machine screw element relative to said screw gear, alternatively linear or rotational movement of said standard machine screw element causing through said cooperative threaded engagement rotational motion of said screw gear relative to said standard machine screw element, whereby one of said screw gear and standard machine screw element may be moved to adjust the position of the other of said screw gear and standard machine screw element further comprising at least a second standard thread screw element of the same thread as said first standard thread screw element, and said second standard threaded screw element engaging said threaded portion of said screw gear.

7. An adjusting mechanism as in clam 6, further comprising a mechanism housing (340a) wherein said first and second standard thread screw elements engage different portions of said plurality of semi-circular or less threads of said same one of said family of screw threads, each of first and second standard thread screw elements having an axis of rotation lying in a plane perpendicular to said axis of relative rotation of said screw gear 342, said screw gear and said first and second standard thread screw elements each being mounted in said mechanism housing (340a), for rotational motion, and said first and second standard thread screw elements each being mounted in said mechanism housing (340a) for further axial motion along its axis, whereby axial movement of said first and second standard screw elements causing the axial movement of the other of said first and second standard screw elements rotation of said screw gear (342), and rotation of one said first and second standard screw elements causes the axial motion of the other of said first and second standard screw elements and rotation of said screw gear (342).

8. An adjusting mechanism as in claim 7, wherein said first and second standard thread screw elements are parallel to each other and lie in bores (340b) formed in said mechanism housing (340a), said screw gear having a rotatable shaft extending therefrom and extending out from said mechanism housing (340a).

* * * * *